(12) United States Patent
Hawley

(10) Patent No.: US 12,291,204 B2
(45) Date of Patent: May 6, 2025

(54) DOWNHILL TARGET ACCELERATION CONTROL

(71) Applicant: TOYOTA MOTOR ENGINEERING & MANUFACTURING NORTH AMERICA, INC., Plano, TX (US)

(72) Inventor: Thomas S. Hawley, Ann Arbor, MI (US)

(73) Assignees: Toyota Motor Engineering & Manufacturing North America, Inc., Plano, TX (US); Toyota Jidosha Kabushiki Kaisha, Aichi-Ken (JP)

( * ) Notice: Subject to any disclaimer, the term of this patent is extended or adjusted under 35 U.S.C. 154(b) by 135 days.

(21) Appl. No.: 18/166,375

(22) Filed: Feb. 8, 2023

(65) Prior Publication Data

US 2024/0262356 A1    Aug. 8, 2024

(51) Int. Cl.
*B60W 30/14* (2006.01)
*B60W 10/04* (2006.01)
*B60W 10/11* (2012.01)
*B60W 10/196* (2012.01)
(Continued)

(52) U.S. Cl.
CPC .......... *B60W 30/146* (2013.01); *B60W 10/04* (2013.01); *B60W 10/11* (2013.01); *B60W 10/196* (2013.01); *B60W 30/18127* (2013.01); *B60W 50/14* (2013.01); *B60W 2050/146* (2013.01); *B60W 2520/105* (2013.01); *B60W 2530/10* (2013.01); *B60W 2540/10* (2013.01); *B60W 2540/12* (2013.01);
(Continued)

(58) Field of Classification Search
CPC ................... B60W 30/146; B60W 30/18127
See application file for complete search history.

(56) References Cited

U.S. PATENT DOCUMENTS

| | | |
|---|---|---|
| 2012/0191278 A1 | 7/2012 | Wippler |
| 2014/0088848 A1 | 3/2014 | Owen |

(Continued)

FOREIGN PATENT DOCUMENTS

| | | |
|---|---|---|
| CN | 114590233 A | 6/2022 |
| GB | 2483720 A | 3/2012 |

(Continued)

*Primary Examiner* — Imran K Mustafa
(74) *Attorney, Agent, or Firm* — HAYNES AND BOONE, LLP

(57) ABSTRACT

A downhill target acceleration control system for a vehicle is provided, which includes the vehicle, a road grade sensor, an acceleration sensor, and a processor. The processor stores an acceleration target value, determines the mass of the vehicle, and detects whether a downhill acceleration of the vehicle exceeds the target value by more than a threshold amount. If so, the processor is configured to receive and implement a driver-initiated change to the downhill target acceleration value, without input from the accelerator or brake. Based on the downhill acceleration, the target value, and the mass, the processor generates a negative power train torque request to reduce the downhill acceleration of the vehicle. If the acceleration of the vehicle is then below the target acceleration by more than a second threshold amount, the processor reduces the negative power train torque request to increase the downhill acceleration of the vehicle.

20 Claims, 19 Drawing Sheets

(51) Int. Cl.
*B60W 30/18* (2012.01)
*B60W 50/14* (2020.01)

(52) U.S. Cl.
CPC . *B60W 2552/15* (2020.02); *B60W 2710/1005* (2013.01); *B60W 2710/18* (2013.01); *B60W 2720/106* (2013.01)

(56) References Cited

U.S. PATENT DOCUMENTS

| | | | | |
|---|---|---|---|---|
| 2014/0180554 | A1* | 6/2014 | Takahashi | B60W 40/10 |
| | | | | 701/70 |
| 2018/0134291 | A1* | 5/2018 | Burford | B60K 31/00 |
| 2018/0186375 | A1* | 7/2018 | Ó Meachair | B60W 50/16 |
| 2018/0345982 | A1* | 12/2018 | Falkhäll | B60W 40/076 |
| 2021/0213948 | A1* | 7/2021 | Lahti | B60W 30/162 |
| 2023/0034858 | A1* | 2/2023 | Gloceri | B60W 40/1005 |

FOREIGN PATENT DOCUMENTS

| | | |
|---|---|---|
| GB | 2505028 A | 2/2014 |
| KR | 101774688 B1 | 9/2017 |
| WO | 9416304 A1 | 7/1994 |
| WO | 2013191614 A1 | 12/2013 |

\* cited by examiner

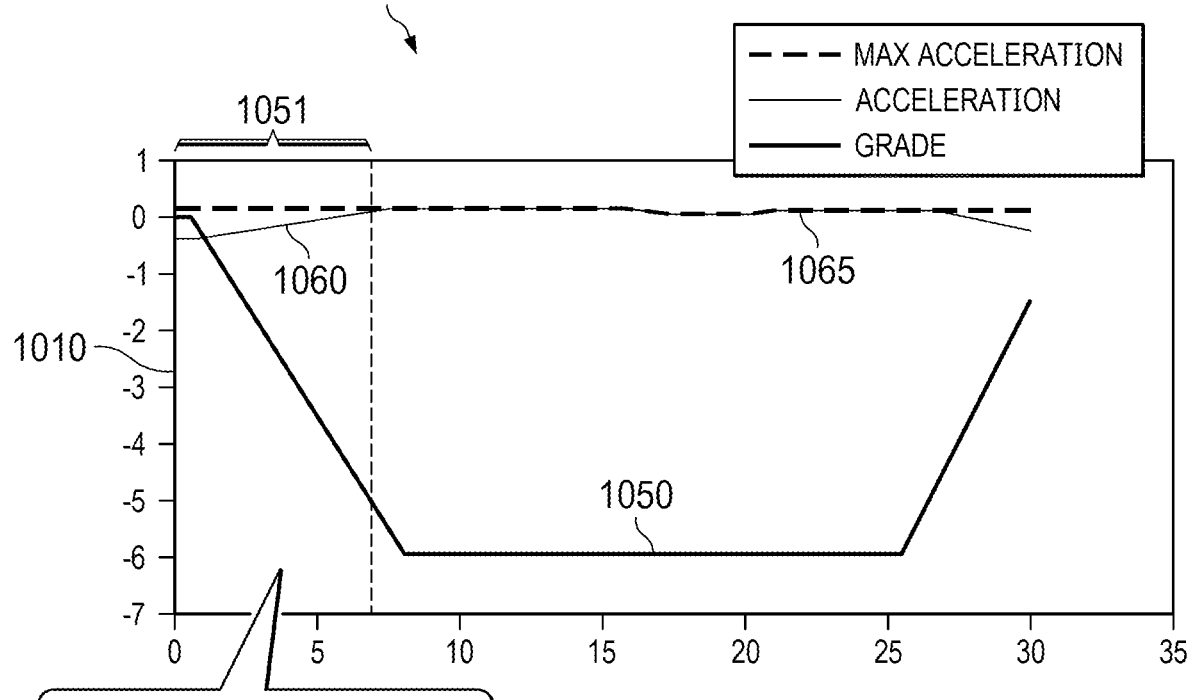
FIG. 10A
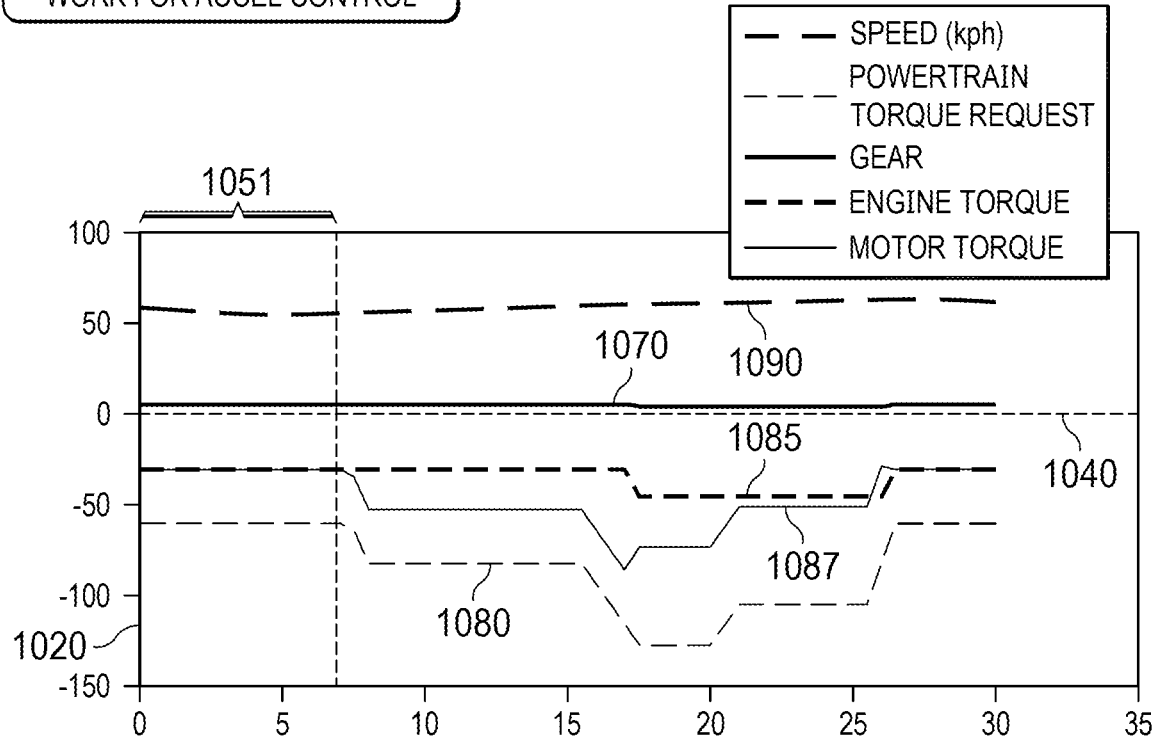

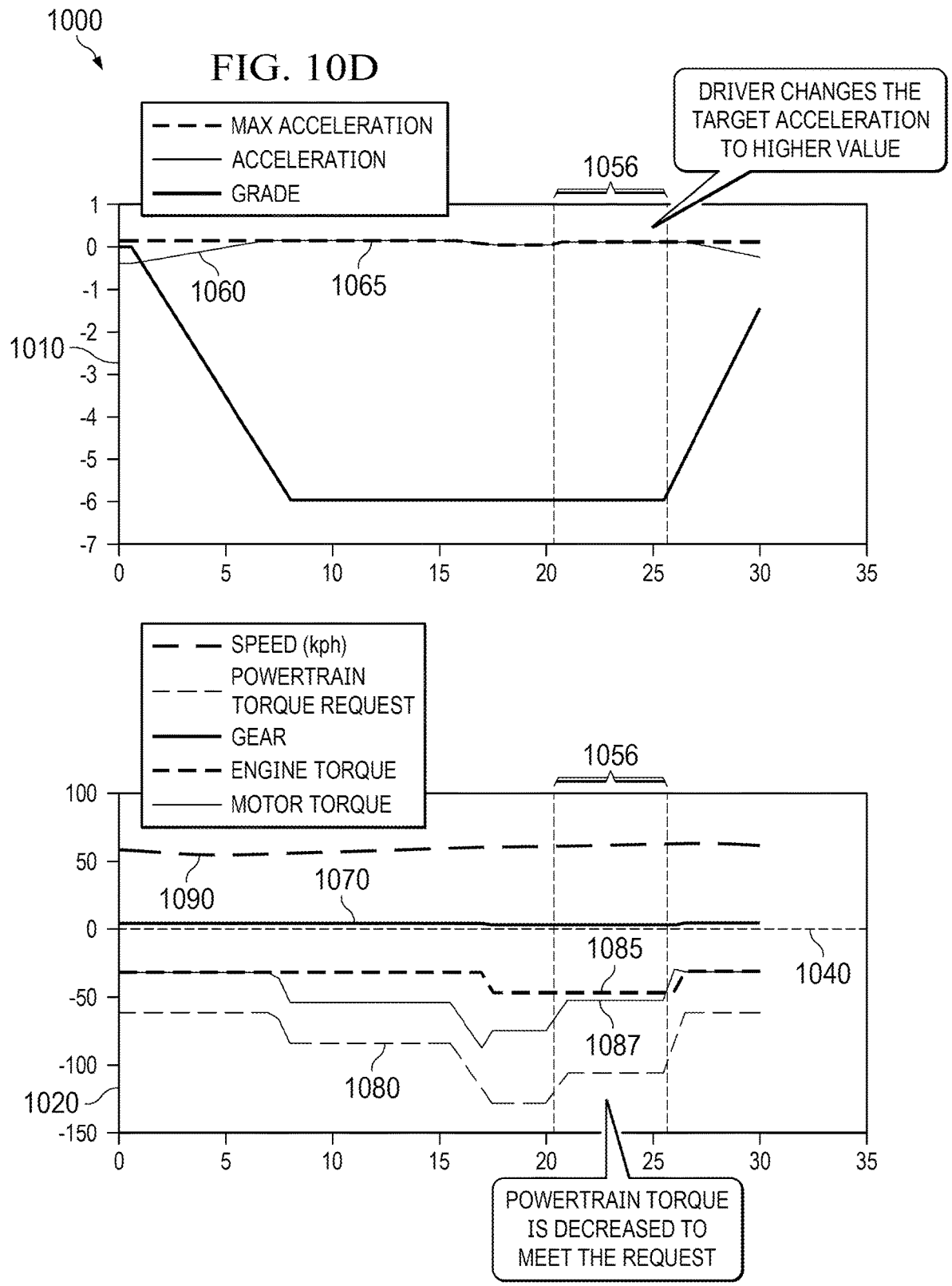

DOWNHILL TARGET ACCELERATION CONTROL

TECHNICAL FIELD

The subject matter described herein relates generally to improving the drivability of a vehicle and, more particularly, to apparatus, systems, and methods for accepting driver input to customize and control downhill acceleration under varying road grade conditions, in real time or near real time. This method has particular but not exclusive utility for consumer and commercial cars and trucks with automatic transmission and electrical, internal combustion, or hybrid propulsion.

BACKGROUND

The road load on a vehicle increases when the vehicle is traveling uphill, and decreases when the vehicle is traveling downhill. To prevent runaway acceleration, many vehicles include control systems to limit speed or acceleration on a downhill grade. In the development of such downhill speed control systems, the desired values for variables such as maximum acceleration are set by the manufacturer based on perceived market preference. However, different drivers have different driving styles, and the same driver may have different driving preferences at different times. In general, vehicles lack customization to allow the driver to fit the control system to their driving style. For instance, some drivers do not like to accelerate downhill when there is no pedal input, while others prefer a "no deceleration" feel and want to use the slope of the hill to gain momentum.

For these and other reasons, throttle mapping, shift mapping, and brake response during downhill travel present numerous unaddressed challenges in the art. Accordingly, long-felt needs exist for apparatus, systems, and methods that address the forgoing or other concerns.

The information included in this Background section of the specification is included for technical reference purposes only and is not to be regarded as subject matter by which the scope of the disclosure is to be bound.

SUMMARY

Disclosed are apparatus, systems, and methods for controlling downhill acceleration of a vehicle.

The present disclosure is directed to controlling downhill acceleration of a vehicle, and accepting driver input for changing the parameters of the downhill acceleration control. With present systems, some customers complain of a "stuck" feeling or "runaway" feeling associated with too little or too much acceleration, respectively. The present disclosure enables the driver to choose the maximum acceleration allowed during downhill travel without accelerator or brake input. Based on this selected value, the powertrain then uses feedback control, based on vehicle and environmental sensors, to limit the maximum acceleration allowed. This may allow more precise and customized control to fit the powertrain's responses to each customer's preferences.

The downhill target acceleration control system disclosed herein has particular, but not exclusive, utility for consumer and commercial cars and trucks with automatic or continuously variable transmission and electric, internal combustion, or hybrid propulsion.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a downhill target acceleration control system for a vehicle. The downhill target acceleration control system includes the vehicle, a first sensor configured to determine a road grade of a road at a current position of the vehicle, and a second sensor configured to determine an acceleration of the vehicle in a direction tangent to a surface of the road. The system also includes a processor that includes a memory and is configured to: store a downhill acceleration target value; determine a mass of the vehicle; based on the road grade and the acceleration, detect whether a downhill acceleration of the vehicle exceeds the downhill acceleration target value by more than a first threshold amount; if the downhill acceleration of the vehicle exceeds the downhill acceleration target value by more than the first threshold amount: receive and implement a driver-initiated change to the downhill acceleration target value, where the driver-initiated change does not require an input from an accelerator pedal of the vehicle or a brake pedal of the vehicle; based on the downhill acceleration, the downhill acceleration target value, and the mass of the vehicle, generate a negative power train torque request to reduce the downhill acceleration of the vehicle; and if, after generating the negative power train torque request, the acceleration of the vehicle is below the downhill acceleration target value by more than a second threshold amount, reduce the negative power train torque request to increase the downhill acceleration of the vehicle. Other embodiments of this aspect include corresponding computer systems, apparatus, and computer programs recorded on one or more computer storage devices, each configured to perform the actions of the methods.

Implementations may include one or more of the following features. In some embodiments, receiving the driver-initiated change involves displaying a message to the driver and receiving inputs from the driver in response to the message. In some embodiments, the processor is further configured to, after generating the negative power train torque request, downshift a transmission of the vehicle in order to meet the negative power train torque request. In some embodiments, the processor is further configured to, after generating the negative power train torque request, increase regenerative braking of an electric motor of the vehicle in order to meet the negative power train torque request. In some embodiments, the processor is further configured to, after reducing the negative power train torque request, upshift a transmission of the vehicle in order to meet the reduced negative power train torque request. In some embodiments, the processor is further configured to, after reducing the negative power train torque request, decrease regenerative braking of an electric motor of the vehicle in order to meet the reduced negative power train torque request. In some embodiments, the processor is further configured to, if the negative torque available is insufficient to meet the generated negative torque request, issue a warning to the driver to activate the brake pedal. In some embodiments, the processor is further configured to, if the increased downhill acceleration of the vehicle is less than the downhill acceleration target value, issue a warning to the driver to activate the accelerator pedal. In some embodiments, generating the negative power train torque request is further based on a gain value, where the gain value is proportional to a difference between the downhill acceleration and the downhill acceleration target value. In some embodiments, at least one of the first threshold amount or the second threshold amount is greater than zero. Implementations of the described techniques may include hardware, a method or process, or computer software on a computer-accessible medium.

One general aspect includes a downhill target acceleration control method for a vehicle. The downhill target acceleration control method includes: with a processor that includes a memory: storing a downhill acceleration target value; with a first sensor, determining a road grade of a road at a current position of the vehicle; with a second sensor, determining an acceleration of the vehicle in a direction tangent to a surface of the road; determining a mass of the vehicle; based on the road grade and the acceleration, detecting whether a downhill acceleration of the vehicle exceeds the downhill acceleration target value by more than a first threshold amount; if the downhill acceleration of the vehicle exceeds the downhill acceleration target value by more than the first threshold amount: receiving and implementing a driver-initiated change to the downhill acceleration target value, where the driver-initiated change does not require an input from an accelerator pedal of the vehicle or a brake pedal of the vehicle; based on the downhill acceleration, the downhill acceleration target value, and the mass of the vehicle, generating a negative power train torque request to reduce the downhill acceleration of the vehicle; and if, after generating the negative power train torque request, the acceleration of the vehicle is below the downhill acceleration target value by more than a second threshold amount, reducing the negative power train torque request to increase the downhill acceleration of the vehicle. Other embodiments of this aspect include corresponding computer systems, apparatus, and computer programs recorded on one or more computer storage devices, each configured to perform the actions of the methods.

Implementations may include one or more of the following features. In some embodiments, receiving the driver-initiated change involves displaying a message to the driver and receiving inputs from the driver in response to the message. In some embodiments, the method may include: after generating the negative power train torque request, downshifting a transmission of the vehicle in order to meet the negative power train torque request. In some embodiments, the method may include: after generating the negative power train torque request, increasing regenerative braking of an electric motor of the vehicle in order to meet the negative power train torque request. In some embodiments, the method may include: after reducing the negative power train torque request, upshifting a transmission of the vehicle in order to meet the reduced negative power train torque request. In some embodiments, the method may include: after reducing the negative power train torque request, decreasing regenerative braking of an electric motor of the vehicle in order to meet the reduced negative power train torque request. In some embodiments, the method may include: if the negative torque available is insufficient to meet the generated negative torque request, issuing a warning to the driver to activate the brake pedal. In some embodiments, the method may include: if the increased downhill acceleration of the vehicle is less than the downhill acceleration target value, issuing a warning to the driver to activate the accelerator pedal. In some embodiments, generating the negative power train torque request is further based on a gain value, where the gain value is proportional to a difference between the downhill acceleration and the downhill acceleration target value. Implementations of the described techniques may include hardware, a method or process, or computer software on a computer-accessible medium.

One general aspect includes a downhill target acceleration control method for a vehicle. The downhill target acceleration control method includes, with a processor that includes a memory: storing a downhill acceleration target value; detecting whether a downhill acceleration of the vehicle exceeds the downhill acceleration target value by more than a first threshold amount; if the downhill acceleration of the vehicle exceeds the downhill acceleration target value by more than the first threshold amount: receiving and implementing a driver-initiated change to the downhill acceleration target value, where the driver-initiated change does not require an input from an accelerator pedal of the vehicle or a brake pedal of the vehicle; based on the downhill acceleration and the downhill acceleration target value, generating a negative power train torque request to reduce the downhill acceleration of the vehicle; and if, after generating the negative power train torque request, the acceleration of the vehicle is below the downhill acceleration target value by more than a second threshold amount, reducing the negative power train torque request to increase the downhill acceleration of the vehicle. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of downhill target acceleration control system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which:

FIG. 10A is a performance graph of the example downhill acceleration control method for a hybrid vehicle, in accordance with at least one embodiment of the present disclosure.

FIG. 10D is a is the same performance graph of the example downhill acceleration control method for a hybrid vehicle, with a different time period highlighted, in accordance with at least one embodiment of the present disclosure.

DETAILED DESCRIPTION

Figure 1:
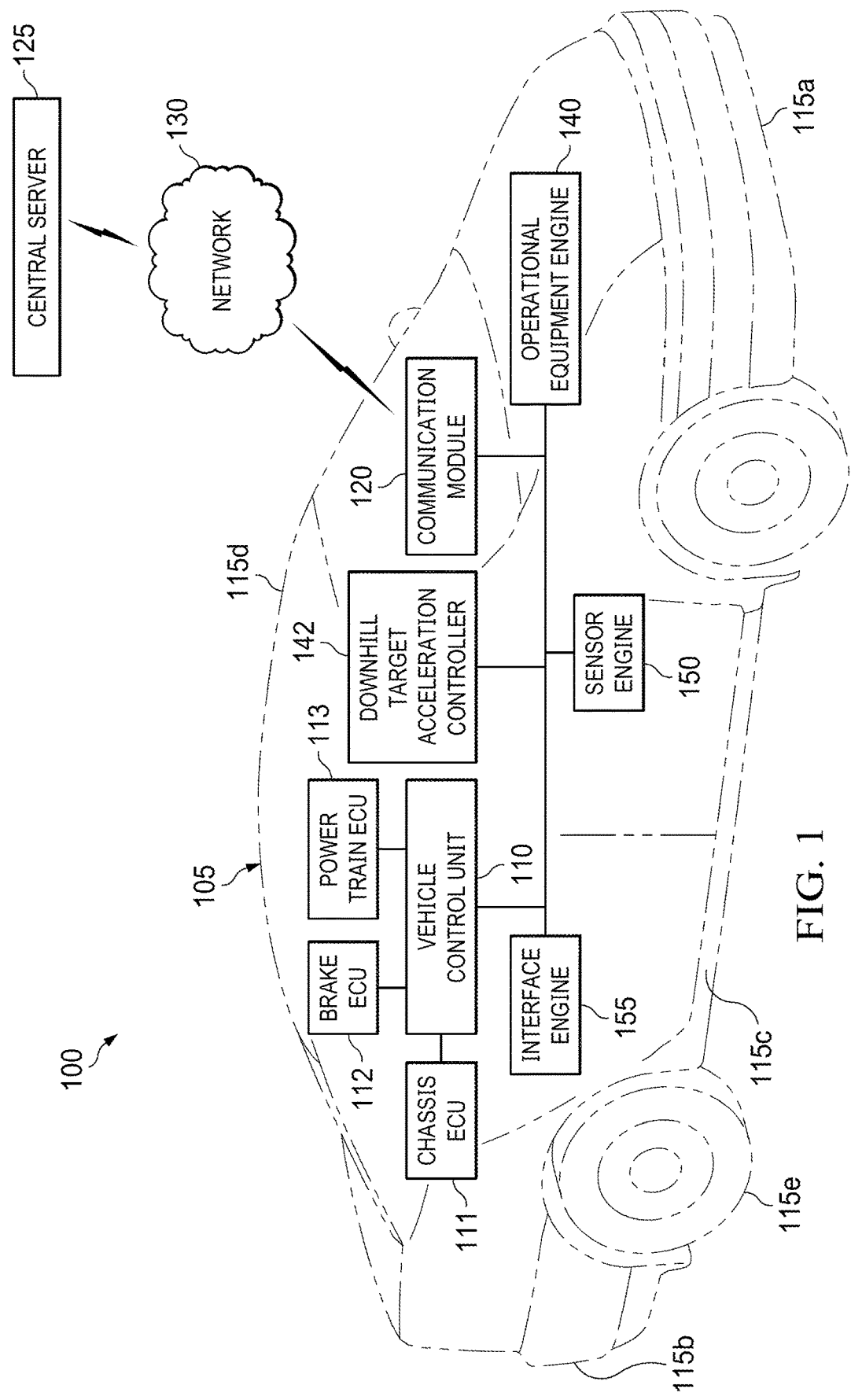
FIG. 1 is a diagrammatic illustration of a vehicle including a downhill target acceleration control system, in accordance with at least one embodiment of the present disclosure.

The present disclosure is generally directed to controlling downhill acceleration of a vehicle, and for accepting real-time or near-real-time driver input for changing the parameters of the downhill acceleration control. Depending on circumstances, a driver may activate the brake pedal or accelerator pedal while traveling downhill. However, with present systems, in situations where neither pedal is activated, some customers complain of a "stuck" feeling or "runaway" feeling associated with too little or too much acceleration, respectively.

The present disclosure provides the vehicle's driver with a selectable input to choose the maximum acceleration allowed during downhill travel, or a target acceleration for the control system, without accelerator or brake input. Based on this selected value, the powertrain then uses feedback control to limit the maximum acceleration allowed. The input could be on the steering wheel, paddle shifters, touchscreen, or otherwise, including voice or gesture control. Once this value is set, the system uses feedback from vehicle and environmental sensors to control the acceleration to the within a threshold value of the target acceleration, without any driver input. This may allow more precise and customized control to fit the powertrain's responses to each customer's preferences. Furthermore, it allows a driver to change the vehicle's response in real time or near-real time Hereinafter referred to as a "downhill target acceleration control system," the present disclosure provides apparatus, systems, and methods to help to provide a desired vehicle acceleration response during downhill travel, particularly but not exclusively when there are no driver inputs to the brake pedal or accelerator pedal.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. It is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

These descriptions are provided for exemplary purposes, and should not be considered to limit the scope of the downhill target acceleration control system. Certain features may be added, removed, or modified without departing from the spirit of the claimed subject matter.

FIG. 1 is a diagrammatic illustration of a downhill target acceleration control system in accordance with at least one embodiment of the present disclosure. In an example, a downhill target acceleration control system is referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140, as will be described in further detail below. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the downhill target acceleration control system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, sensor engine 150, and a downhill target acceleration controller 142, the operation of which will be described below.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

Figure 2:
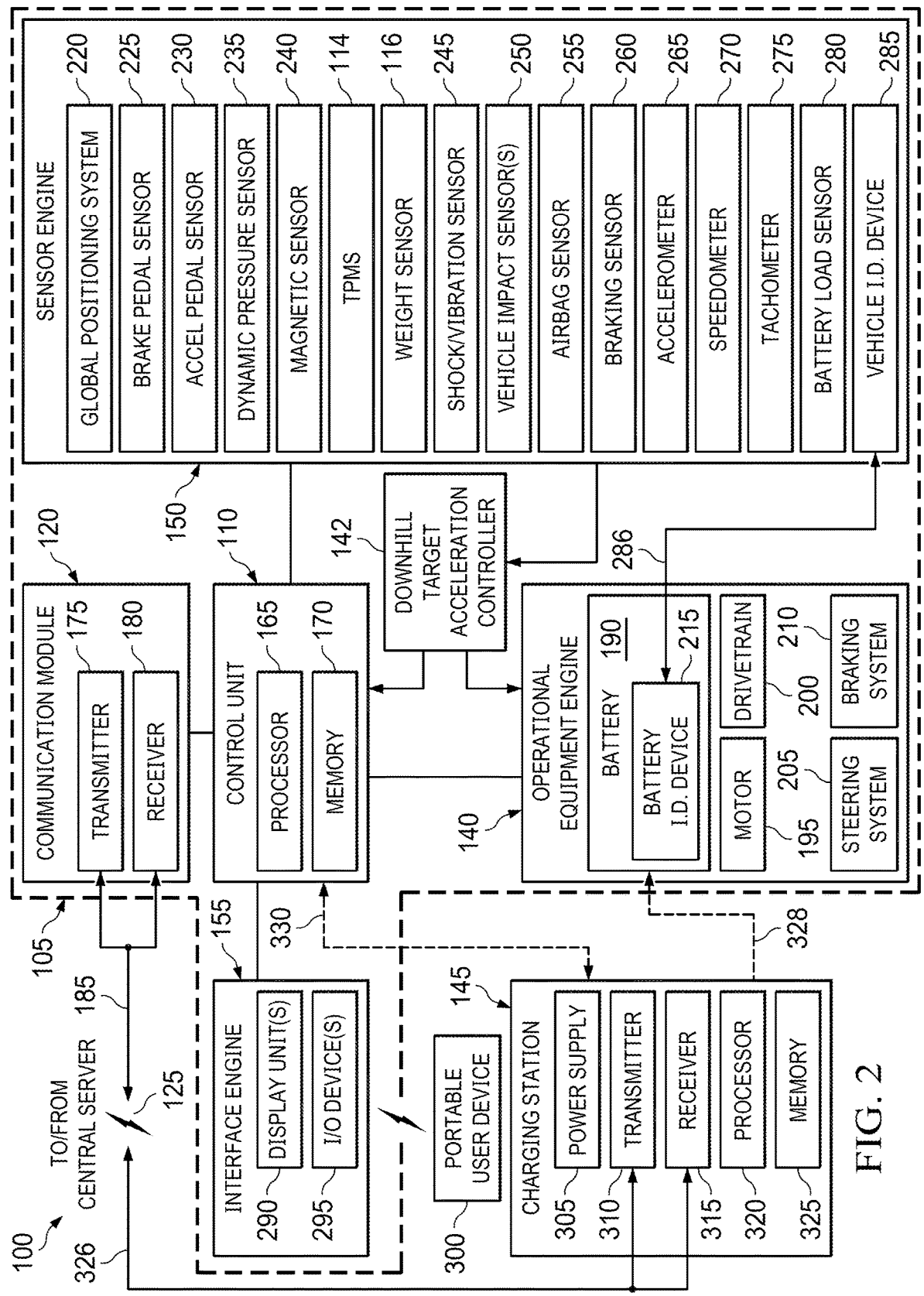
FIG. 2 is a diagrammatic illustration, in a block-diagram form, of at least a portion of the downhill target acceleration control system of FIG. 1, in accordance with at least one embodiment of the present disclosure.

FIG. 2 is a diagrammatic illustration, in a block-diagram form, of at least a portion of the downhill target acceleration control system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215. The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system 220 that can be used to determine road grade, a brake pedal sensor 225, an accelerator pedal sensor 230, a dynamic pressure sensor (e.g., Pitot tube) or anemometer 235 that can be used to determine a wind resistance magnitude or vector, a magnetic sensor 240, a shock/vibration sensor 245, a vehicle impact sensor 250, an airbag sensor 255, a braking sensor 260, an accelerometer 265 $m$ (which may in some cases also serve as an inclinometer), a speedometer 270, a tachometer 275, a battery load sensor 280, a vehicle identification device 285, a tire pressure monitoring system (TPMS) 114 that monitors tire pressure and can be used to determine a tire-related friction coefficient, a weight sensor 116, or any combination thereof. The sensors or other detection devices may be configured to sense or detect activity, conditions, and circumstances in an area to which the device has access, e.g., ambient conditions or conditions within a battery compartment. Sub-components of the sensor engine 150 may be deployed at any operational area where information on the driving of the vehicle 105 may occur. Readings from the sensor engine 150 are fed back to the vehicle control unit 110. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried onto the vehicle 105 by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

The downhill target acceleration control system 100 also includes a downhill target acceleration controller 142, the operation of which will be described below. In some embodiments, the downhill target acceleration controller 142 comprises a standalone housing with its own processor and memory. In other embodiments, the acceleration compensation engine exists as software, firmware, or hardware within another processor, such as the vehicle control unit 110, operational equipment engine 140, or power train ECU 113. The sensor engine 150 includes environmental sensors and vehicle sensors.

A reader of ordinary skill in the art will understand that other components or arrangements of components may be found in a vehicle 105, and that the same general principles apply to electric vehicles, internal combustion vehicles, and hybrid vehicles.

Figure 3:
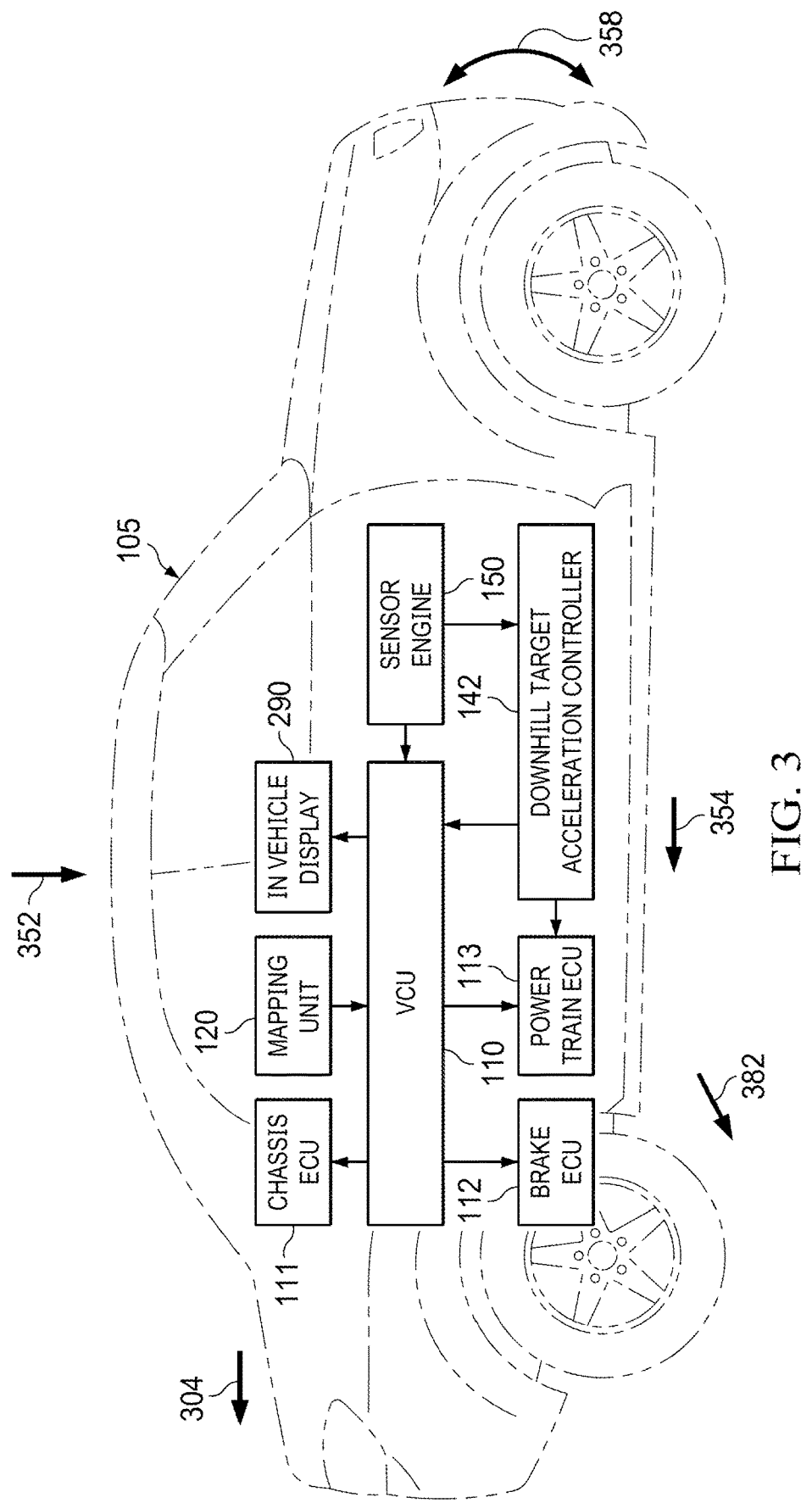
FIG. 3 is an exemplary diagrammatic illustration of the downhill target acceleration control system embodied as a vehicle, in accordance with at least one embodiment of the present disclosure.

FIG. 3 is an exemplary diagrammatic illustration of the downhill target acceleration control system 100 embodied as a vehicle 105 in accordance with at least one embodiment of the present disclosure. In this implementation, for clarity, only certain engines, systems, and components are shown. However, other engines, systems, and components, including those describe herein, are also contemplated as being a part of the downhill target acceleration control system 100 shown in FIG. 3. In this example, within the vehicle 105 the VCU 110 receives information from a sensor engine 150, which receives information from environmental sensors and vehicle sensors. In addition, the VCU 110 sends information to the chassis ECU 111, brake ECU 112, power train ECU 113, and in-vehicle display 290.

Force variables that may be incorporated into physics calculations within the VCU 110, downhill target acceleration controller 142, or other engines include but are not limited to the vehicle absolute weight 352, vehicle rolling friction 354, vehicle aerodynamic drag 304, and vehicle pitch 358. In some examples, each of these variables is a force that may be expressed in lbf, Newtons, degrees, or any other unit as needed. In an example, the vehicle pitch 358 is stored within the memory 170 of the Vehicle Control Unit 110, and is calculated based on data from the accelerometer 265 to provide a sensed acceleration, and the first derivative of the vehicle speed 270 from the speedometer 270 to provide an acceleration value tangent or parallel to the road surface. The difference between these two acceleration vectors can indicate vehicle pitch 358. Vehicle pitch may also be measured with an inclinometer or geomagnetometer.

Other variables may not be directly known, but may be estimated from graphs, curves, or lookup tables for a nominal vehicle (e.g., vehicle weight 352, vehicle rolling friction 354, and vehicle aerodynamic drag 304). Some variables may be calculated or estimated from performance variables that normally exist within the VCU 110. For example, the combined mass, gross weight, or inertia of the vehicle 105 may be determined from the acceleration profile of the vehicle given a known force imparted by the motor 195 and drivetrain 200, and the Newtonian relationship $F=ma$. The mass of the carried load may then be estimated by subtracting a nominal or expected vehicle mass (e.g., stock weight or stock mass). Alternatively, if the road grade is known (e.g., from GPS data), the combined vehicle and carried load mass may be estimated based on the work or energy required for the operational equipment engine to push the vehicle uphill, or the force required hold it from rolling backward.

The total drag on the vehicle can be calculated based on the power output required to maintain a particular vehicle speed 270, and the sum of nominal or estimated values of the vehicle rolling friction 354 and aerodynamic drag 304. The ratio of aerodynamic drag to rolling friction can be estimated from known relationships for typical vehicles, or by other methods. The grade of the road or ground surface under the vehicle may be calculated from accelerometers, or may be calculated or taken directly from stored maps, GPS data or other indicators. The combination of vehicle weight 352, vehicle aerodynamic drag 304, and vehicle rolling friction 354 can be used to compute a vehicle rolling resistance vector 382 (e.g., as a vector sum of the force vectors). Histories, time averages, first derivatives, integrals, or filters of any of the aforementioned variables, along with known, anticipated, or estimated future values for some or all of the variables may also be incorporated into the physics calculations to improve or refine the results of the calculations. Accelerator pedal position may also be incorporated as being proportional to an expected power output from the motor 195.

The downhill target acceleration control system 100 also includes a downhill target acceleration controller 142, which accepts inputs from the sensor engine (e.g., inputs from the GPS 220, brake pedal sensor 225, accelerator pedal sensor 230, weight sensor 116, accelerometer 265, and speedometer 270) and provides outputs, for example, to the VCU 110 or power train ECU 113.

Figure 4:
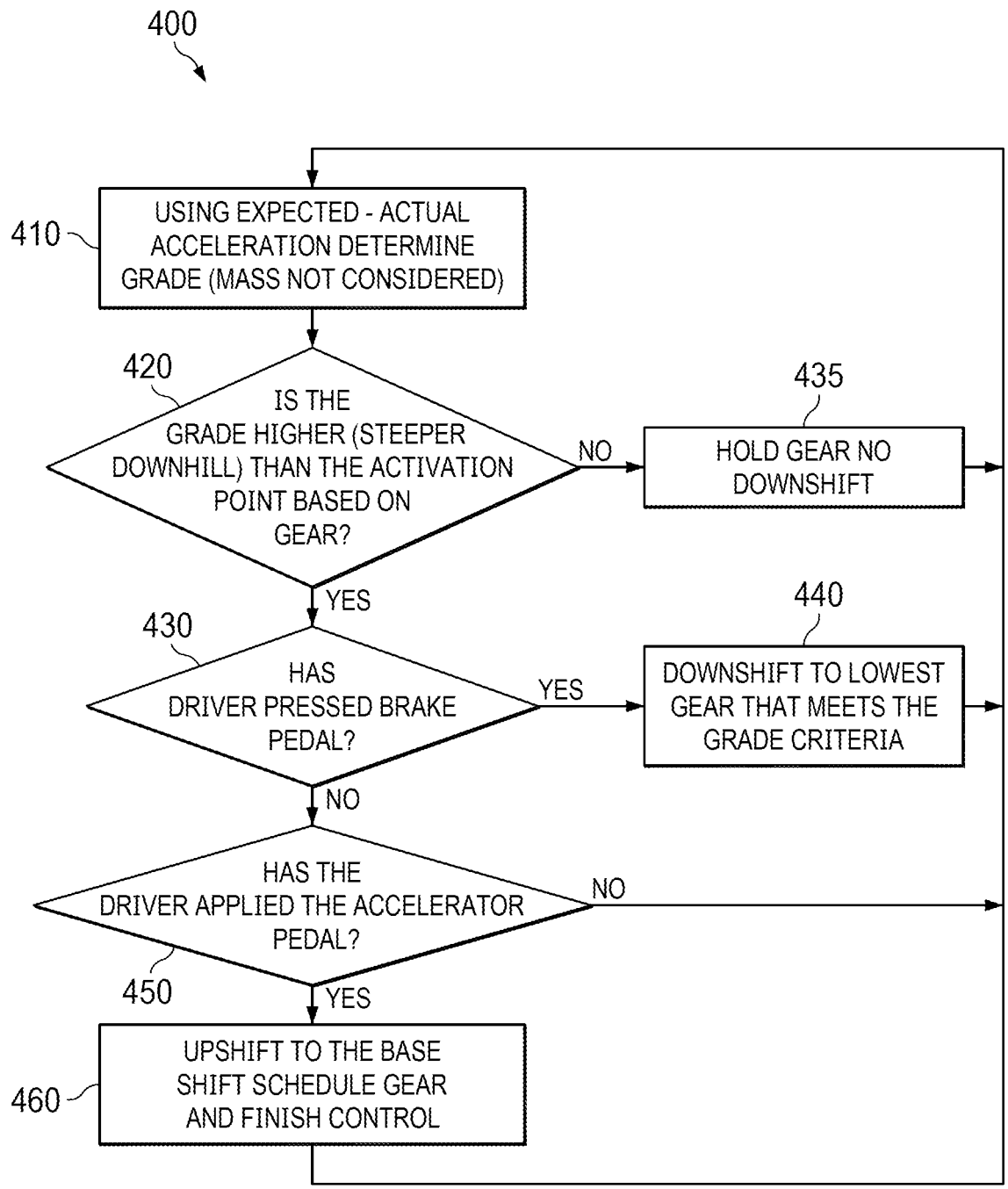
FIG. 4 shows a flow diagram of an example downhill acceleration control method 400, in accordance with at least one embodiment of the present disclosure.

FIG. 4 shows a flow diagram of an example downhill acceleration control method 400, in accordance with at least one embodiment of the present disclosure. With current downhill acceleration control methods there may be a predefined grade or slope that activates certain actions. For example, with an internal combustion engine (ICE), the method may trigger additional downshift to add more engine braking. The downshift may for example only be activated when the driver applies the brake pedal, in which case the transmission may not upshift again until the driver applies the accelerator pedal for a set duration. At that point, the upshift can occur, thus reducing engine braking.

Similarly, for current hybrid vehicles, a downhill acceleration control method may for example be the same as, or similar to, the method for ICE vehicles. For example, the motor torque may not vary based on the grade, and the deceleration torque between the engine and motor may be fixed for each engine speed based on calibration.

For a purely electric vehicle (EV), a downhill acceleration control method may for example involve, when the driver depresses the brake, increasing the downhill negative motor torque to a set value based on the grade. In some embodiments, depending on how fast the vehicle is accelerating, there may be set motor torque value to slow the acceleration.

It is understood that the steps of method 400 may be performed in a different order than shown in FIG. 4, additional steps can be provided before, during, and after the steps, and/or some of the steps described can be replaced or eliminated in other embodiments. One or more of steps of the method 400 can be carried by one or more devices and/or systems described herein, such as components of the downhill target acceleration control system 100, VCU 110, downhill target acceleration controller 142, and/or processor circuit 1550.

In step 410, the method 400 begins by calculating the road grade. This may be done for example by subtracting actual acceleration from expected acceleration and applying a lookup table.

In step 420, the method 400 includes checking whether the road grade exceeds a threshold value (e.g., is a steep enough downhill slope to trigger the acceleration control logic). The threshold value may for example be built into the vehicle's firmware (e.g., in the VCU 110 or power train ECU 113 of FIG. 1). If yes, execution proceeds to step 430. If no, execution proceeds to step 435.

In step 430, the method 400 includes determining whether the driver has depressed the brake pedal. This may for example involve querying the brake pedal sensor 225 (see FIG. 2). If yes, execution proceeds to step 440. If no, execution proceeds to step 450.

In step 435, the method 400 includes holding the present gear, with no upshift or downshift. Execution then returns to step 410.

In step 440, the method 400 includes downshifting the vehicle's transmission into a lower gear, so that "engine braking" (e.g., friction and/or inertia of the engine that can slow the vehicle) is increased. Execution then returns to step 410.

In step 450, the method 400 includes determining whether the driver has depressed the accelerator pedal. This may for example involve querying the accelerator pedal sensor 230 (see FIG. 2). If yes, execution proceeds to step 460. If no, execution returns to step 410.

In step 460, the method 400 includes upshifting the vehicle's transmission into a higher gear, so that "engine braking" is reduced. In some embodiments, execution then returns to step 410. In other embodiments, the method 400 is now complete.

Flow diagrams and block diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, in order to control downhill acceleration in real time, the downhill target acceleration control system 100 may need to execute multiple times per second (e.g., a rate of 10 Hz, 20 Hz, etc.).

Figure 5:
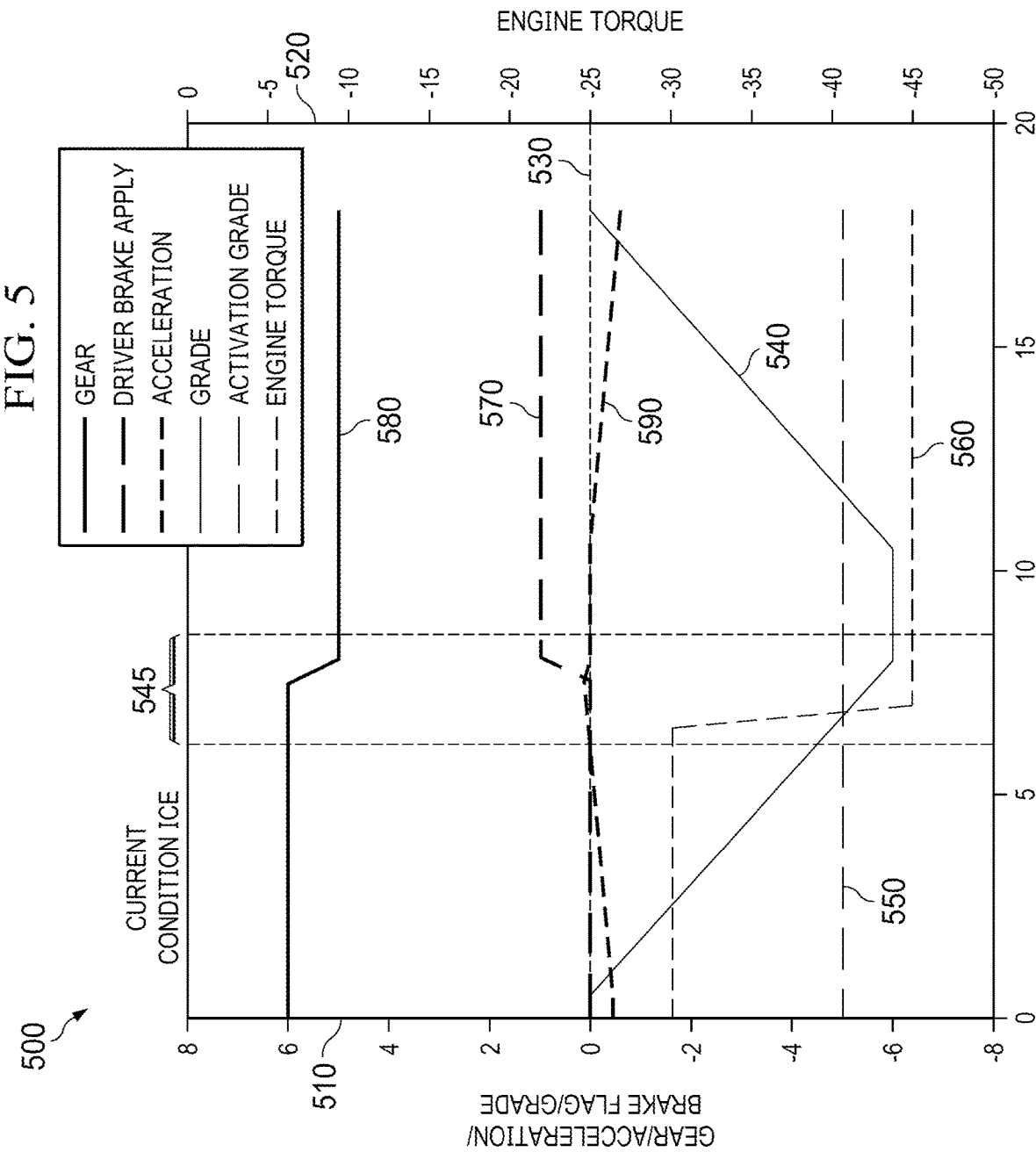
FIG. 5 is a performance graph of the example downhill acceleration control method, in accordance with at least one embodiment of the present disclosure.

FIG. 5 is a performance graph 500 of the example downhill acceleration control method 400, in accordance with at least one embodiment of the present disclosure. The graph 500 includes a Y-axis 510 showing the vehicle gear (nondimensional), vehicle acceleration (m/s$^2$), brake flag (binary), and road grade (nondimensional). The graph 500 also includes a Y-axis 520 showing engine torque (Newton-meters, e.g., negative torque due to friction, inertia, etc.), and an X-axis 530 showing elapsed time in seconds.

A "road grade" line 540 shows a flat road gradually dropping into a steeper and steeper downhill grade, until it exceeds an activation grade 550 of 5.0, during a time period 545 at approximately t=6 seconds. At this point, the driver applies the brake (e.g., by depressing the brake pedal), which triggers the downhill acceleration control method 400, which downshifts the vehicle's transmission from 6$^{th}$ gear to 5$^{th}$ gear, as seen in the "gear" line 580, in order to effect engine braking. Thus, the "engine torque" line 560 shows the engine going from generating −30 N-m of torque—a smaller amount of engine braking—to −45 N-m of torque—a larger amount of engine braking. As a result, the "acceleration" line 590 varies very little, from roughly −0.5 m/s$^2$ to about 0 m/s$^2$ and back to −0.5 m/s$^2$ over the course of the 30-second elapsed time 530.

Thus, the downhill acceleration control method 400 has limited the downhill acceleration to a small value. However, drivers vary in their "road feel" preferences, and some may want more acceleration than is shown in the acceleration line 590 when traveling down a steep grade. Unfortunately, present the example downhill acceleration control systems and methods do not permit the driver to modify the activation grade 550 at which the downhill acceleration control method downshifts the transmission.

Figure 6:
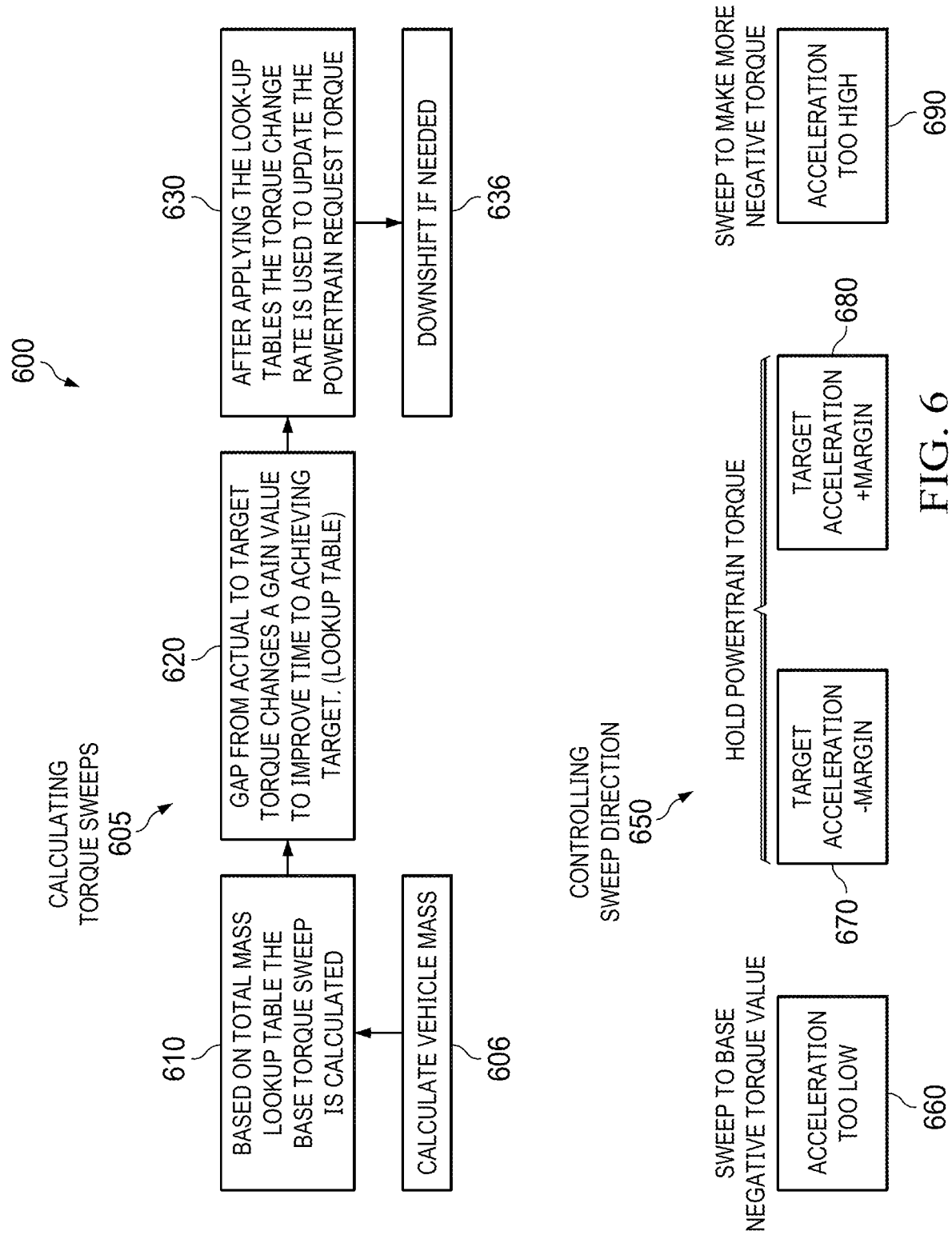
FIG. 6 shows a combined flow diagram and block diagram of an example an example downhill acceleration target control method, in accordance with at least one embodiment of the present disclosure.

FIG. 6 shows a combined flow diagram and block diagram of an example an example downhill acceleration target control method 600, in accordance with at least one embodiment of the present disclosure. In the example shown in FIG. 6, the downhill acceleration target control method 600 includes a torque sweep calculation method 605 and a sweep direction control method 650, forming a closed-loop control system uses power train torque sweeps to find the correct torque, so as not to exceed the specified maximum acceleration, and not to cause an excessive "slowing down" feeling that may be bothersome to the driver or vehicle occupants. The method may also include downshifting, if required, to meet the powertrain negative torque request.

In step 606, the torque sweep calculation method 605 includes calculating the total vehicle mass, as described above in FIG. 3, or as described for example in U.S. Pat. No. 10,507,820 to Hawley et al., issued 17 Dec. 2019, or by other related techniques. Execution then proceeds to step 610.

In step 610, the torque sweep calculation method 605 includes computing a base torque sweep based on a table lookup using the total vehicle mass as an index. Execution then proceeds to step 620

In step 620, the torque sweep calculation method 605 includes calculating a gain value based on the current difference between the actual power train torque and the target power train torque. This gain may for example be larger when the difference is larger, and smaller when the difference is smaller, resulting in more rapid torque changes for a large difference, but with a reduced risk of overcontrolling when the difference is small. Execution then proceeds to step 630.

In step 630, the torque sweep calculation method 605 includes updating the power train torque request based on the base torque sweep and the gain. Execution them proceeds to step 636.

In step 636, the torque sweep calculation method 605 includes downshifting the vehicle transmission to a lower gear, if required, to meet the powertrain negative torque request. This applies most particularly to conventional ICE engines, but may also be used in some circumstances by a hybrid vehicle.

The torque sweep calculation method is now complete.

In block 660, the sweep direction control method 650 has determined that the current downhill acceleration is too low, and will thus increase the acceleration by decreasing the amount of engine braking, based on the total vehicle mass of step 610 and the gain value of step 620.

In block 670, the sweep direction control method 650 has determined that the current downhill acceleration, while lower than the target acceleration, is within a specified deadband and thus should not be adjusted. This creates a window where no adjustment occurs, to help limit the risk of overshoot or undershoot.

In block 680, the sweep direction control method 650 has determined that the current downhill acceleration, while higher than the target acceleration, is within a specified deadband and thus should not be adjusted. As with block 670, this creates a window where no adjustment occurs, to help limit the risk of overshoot or undershoot.

In block 690, the sweep direction control method 650 has determined that the current downhill acceleration is too high, and will thus increase the acceleration by decreasing the amount of engine braking, based on the total vehicle mass of step 610 and the gain value of step 620.

The sweep direction control method 650 is now complete.

In some embodiments, during driver accelerator pedal input, the method may also include holding the current powertrain torque value, until a timer is met. The timer is set based on physical grade (e.g., less downhill creates shorter timer). During brake pedal application, the method may also include holding the current power train torque value, and then once brake is released, continuing the feedback sweep. The design intention of such embodiments is that when the brake is applied, the feedback control is stopped, since the driver is taking over to modulate speed. Once the brake is released, downhill acceleration control may then resume, with feedback to control speed during downhill coasting.

It is noted that block diagrams included herein may show a particular arrangement of components, modules, services, steps, processes, or layers, resulting in a particular data flow. It is understood that some embodiments of the systems or methods disclosed herein may include additional components, that some components shown may be absent from some embodiments, and that the arrangement of components may be different than shown, resulting in different data flows while still performing the methods described herein.

Figure 7A:
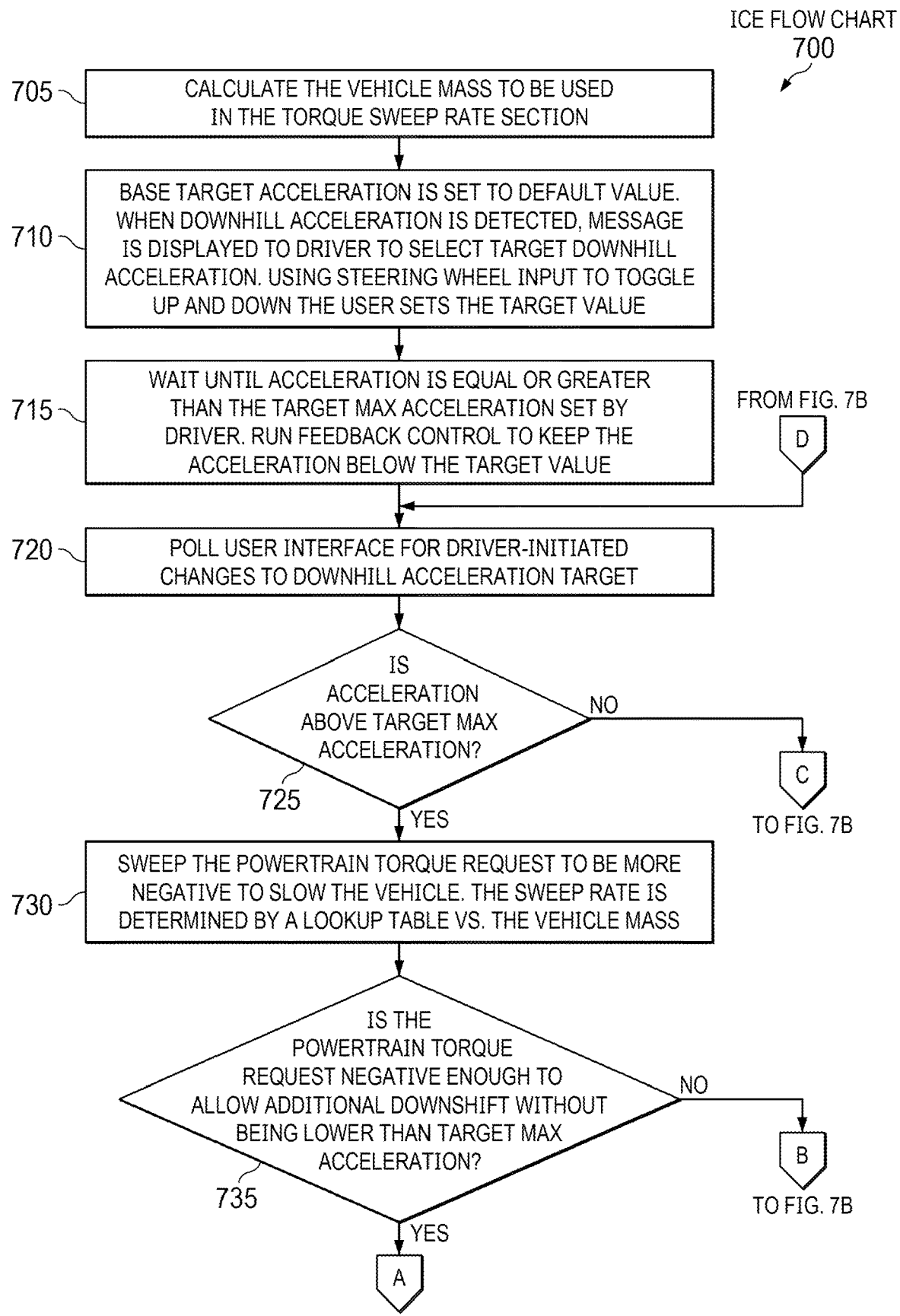
FIG. 7A shows a portion of a flow diagram of an example downhill target acceleration control method for an internal combustion engine, in accordance with at least one embodiment of the present disclosure.
Figure 7B:
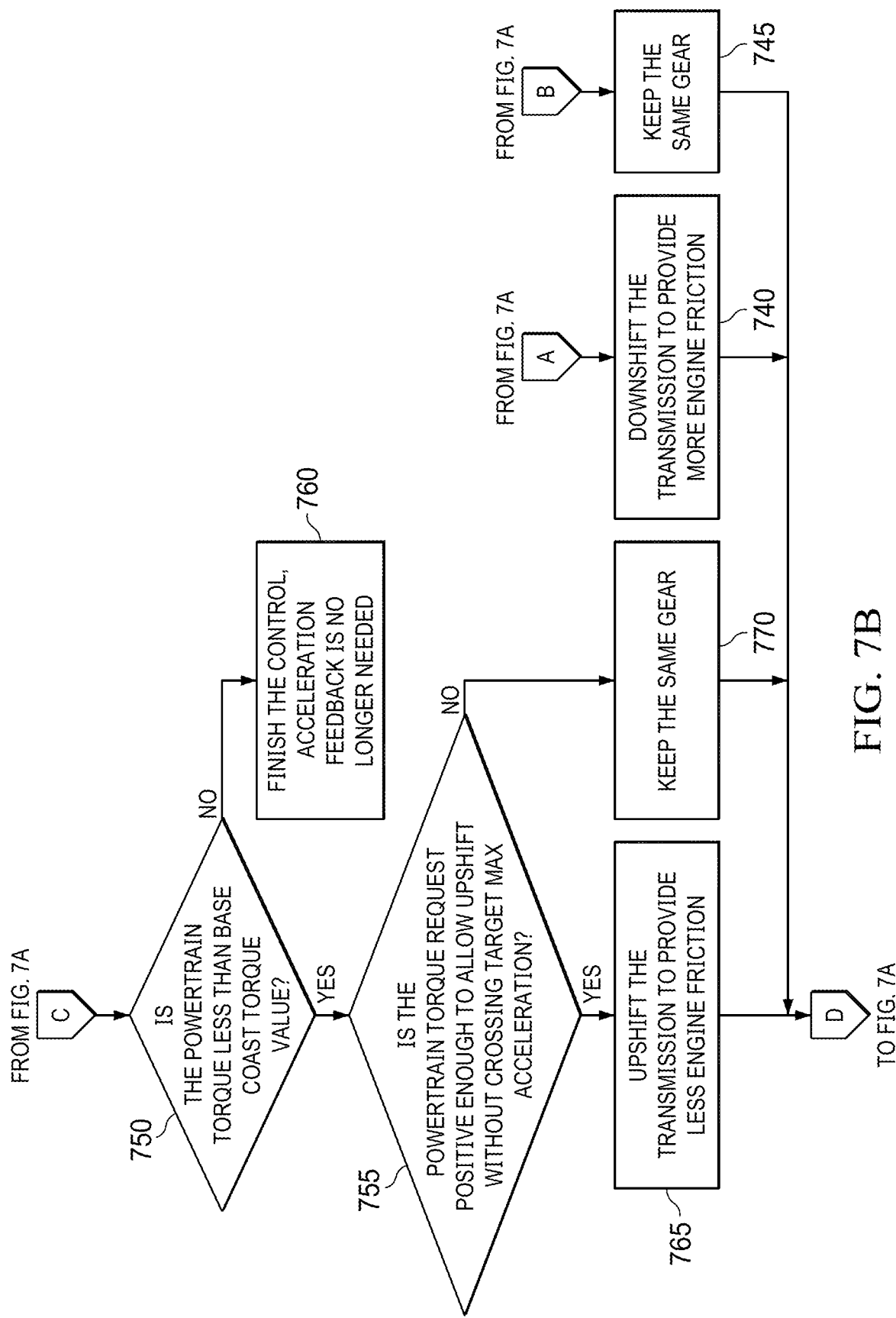
FIG. 7B shows a portion of a flow diagram of an example downhill target acceleration control method for an internal combustion engine, in accordance with at least one embodiment of the present disclosure.

FIGS. 7A and 7B show a flow diagram of an example downhill target acceleration control method 700 for an internal combustion engine, in accordance with at least one embodiment of the present disclosure.

In step 705, the method 700 includes calculating the vehicle mass as described above in FIG. 6. Execution then proceeds to step 710.

In step 710, the method 700 includes displaying a message to the driver indicating that downhill acceleration control is now in progress, showing the current downhill acceleration target value, and informing the user that the downhill acceleration target value can be altered (e.g., with a toggle located on the steering wheel) to be a higher or lower value.

Downhill acceleration may for example be measured directly with an accelerometer, or from a combination of the first derivative of speed readings and a measured road grade. Road grade may be looked up with a global positioning system, measured directly with an inclinometer, or deduced from other motion variables. Execution then proceeds to step 715.

In step 715, the method 700 includes waiting (e.g., looping), executing the downhill acceleration feedback control loop, until a sensed acceleration is equal to or greater than the target maximum acceleration. Execution then proceeds to step 720.

In step 720, the method 700 includes polling the user interface to determine if an input has been received to change the downhill target acceleration. If the input had been received, the method includes updating the default target downhill target acceleration based on the user input. The user input may for example be received via a steering wheel toggle input with an "up" position to increase the target acceleration and a "down" position to decrease the target acceleration. Thus, the driver is able, in real time, to alter the downhill behavior of the vehicle if the road or traffic condition change, or for other reasons such as personal preference. Execution then proceeds to step 725.

In step 725, the method 700 includes determining whether the current vehicle acceleration is greater than the downhill target acceleration. If yes, execution proceeds to then proceeds to step 730. If no, execution proceeds to step 750

In step 730, the method 700 includes calculating a new power train torque request to reduce the vehicle acceleration. This may for example be accomplished with a lookup table based on the vehicle mass and a gain value based on the difference between the current and target accelerations. Execution then proceeds to step 735.

In step 735, the method 700 includes determining whether the torque request is negative enough to allow for a downshift (or additional downshift) without being lower than the downhill acceleration target. If yes, execution proceeds to step 740. If no, execution proceeds to step 745.

In step 740, the method 700 includes downshifting the transmission to a lower gear to generate more engine braking. Execution then returns to step 720.

In step 745, the method 700 includes maintaining the same transmission gear. Execution then returns to step 720.

In step 750, the method 700 includes determining whether the current power train torque is less than the value required for the vehicle to coast (e.g., the current torque will cause the vehicle to decelerate). If yes, execution proceeds to step 755. If no, execution proceeds to step 760.

In step 755, the method 700 includes determining whether the power train torque request is positive enough to allow for an upshift (or additional upshift) without exceeding the target acceleration. If yes, execution proceeds to step 765. If no, execution proceeds to step 770

In step 760, the method 700 includes finishing the control loop, as downhill acceleration feedback control is no longer necessary. The downhill target acceleration control method 700 is now complete.

In step 765, the method 700 includes upshifting the transmission to a higher gear to generate less engine braking. Execution then returns to step 720.

In step 770, the method 700 includes maintaining the same transmission gear. Execution then returns to step 720.

It is noted that the downhill target acceleration control method 700 does not require any pedal input (e.g., accelerator pedal or brake pedal input) from the driver, and does not rely on a fixed value for the downhill acceleration target or downhill acceleration limit. Furthermore, in the absence of accelerator pedal input, the vehicle slows down less with the method 700 than it would in older control methods that do not include automatic upshifting.

Thus, it can be seen that the downhill target acceleration control system is configured to detect a downhill road segment (e.g., using environmental sensors) and, when the acceleration of the vehicle is within a threshold amount from the target maximum acceleration, display a message to the driver indicating that the downhill acceleration control logic is starting to activate. The system then implements feedback control to manage the powertrain negative torque, based on the vehicle mass and the downhill acceleration target. In some embodiments, the system may also display a warning message if there is not enough powertrain braking available to meet the acceleration target, and thus that the driver needs to control the speed of the vehicle (e.g., with the brake pedal or accelerator pedal). The downhill target acceleration indicates the allowed downhill acceleration for the vehicle without pedal input.

Figure 8:
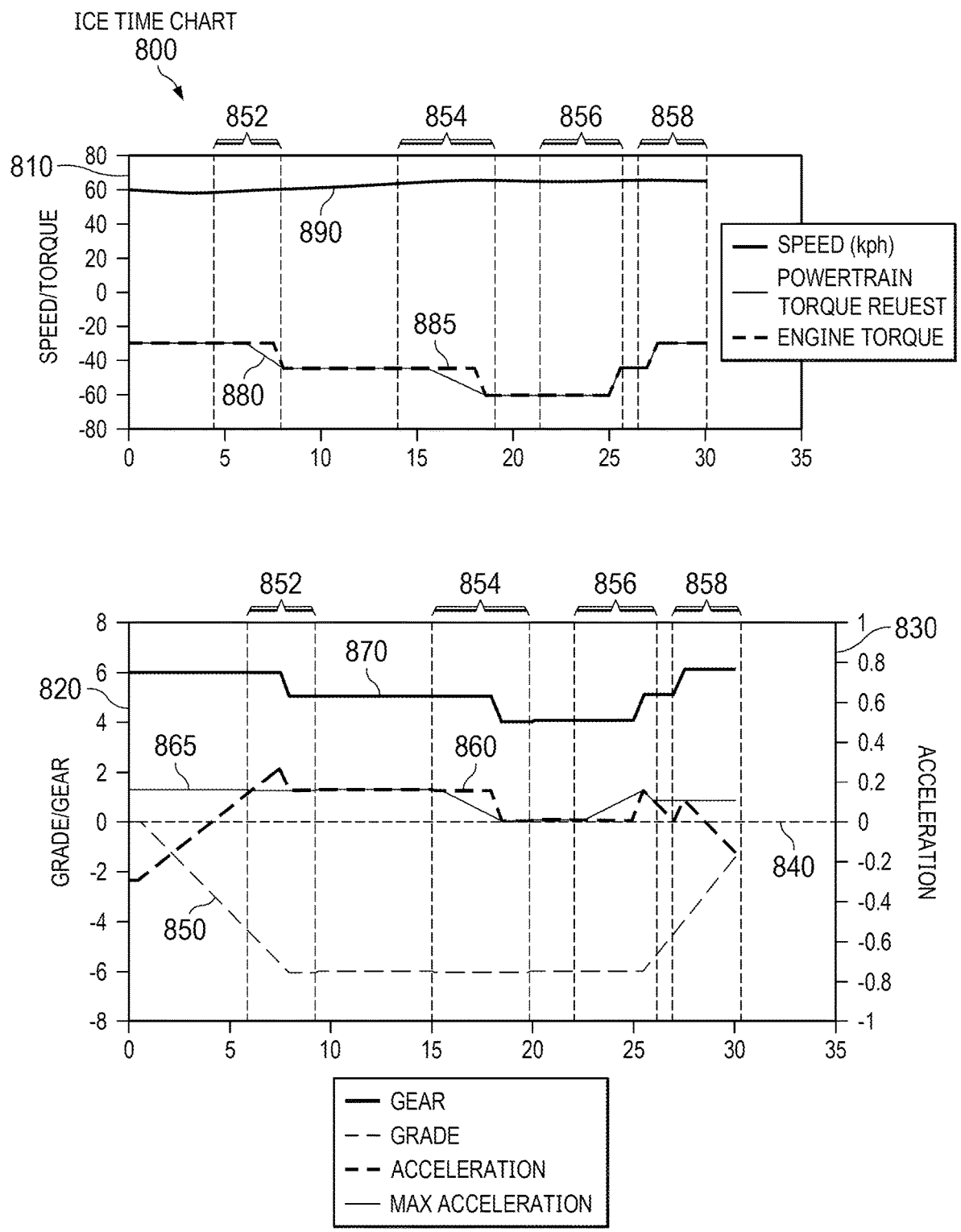
FIG. 8 is a performance graph of the example downhill acceleration control method for an internal combustion vehicle, in accordance with at least one embodiment of the present disclosure.

FIG. 8 is a performance graph 500 of the example downhill acceleration control method 700 for an internal combustion vehicle, in accordance with at least one embodiment of the present disclosure. The vehicle proceeds down a hill and acceleration increases. When the acceleration of the vehicle is within a threshold distance (possibly zero) of the target acceleration without pedal input, the system displays a message or icon showing this control is starting to activate to control downhill speed. Once the control is activated, the system runs the feedback control described above to manage the powertrain negative torque and limit the vehicle's acceleration. The acceleration target without pedal input can be adjusted up or down by driver input, depending on preference. After the control sets the target speed the powertrain must achieve that or display a message warning that warning not enough power train braking is available, and the system requires driver input (e.g., brakes or accelerator) in order to control the speed.

The graph 800 includes a Y-axis 810 showing the vehicle speed (mph), and engine torque (Newton-meters, e.g., negative torque due to friction, inertia, etc.), a Y-axis 820 showing gear (nondimensional) and road grade (nondimensional), and a Y-axis 830 showing vehicle acceleration (m/s$^2$). The graph 800 also includes an X-axis 840 showing elapsed time in seconds.

A "road grade" line 850 shows a flat road gradually dropping into a steeper and steeper downhill grade, and then recovering to a nearly-zero grade at t=30 seconds. The downhill target acceleration control system 100 waits until the commanded acceleration can be met by a downshift then downshifts to meet the target. There is overshoot on the acceleration to preference a "stuck" feel over a "runaway" feel.

As can be seen in the graph 800, the vehicle acceleration 860 increases steadily until a time period 852 around t=7.5 seconds, when it exceeds the acceleration target 865. At this point, the downhill target acceleration control system 100 changes the power train torque request 880 to be more negative, which requires a downshift of the downshifts the transmission gear 870 from 6$^{th}$ gear to 5$^{th}$ gear in order to increase engine braking. The actual engine torque 885 lags somewhat behind the requested engine torque 880, due to the time required to shift gears.

At this point, a message appears to the driver, giving the driver the option to change the target acceleration 865 without pedal input. The driver may, for example, use a touchscreen interface, or buttons, switches, or paddles on the steering wheel, to increase or decrease the target acceleration, without pedal input. This change can be made at any time while the vehicle continues to travel downhill.

In a second time period 854, the driver changes the acceleration target 865 to be smaller than the current acceleration 860. This causes the downhill target acceleration control system 100 to make the power train torque request 880 even more negative, resulting in another downshift of the transmission gear 870, which reduces the acceleration 860 to match the new target 865.

In a third time period 856, the driver changes the target acceleration again, to be larger than the current acceleration. This causes the downhill target acceleration control system 100 to make the power train torque request 880 less negative, resulting in an upshift of the transmission gear 870 from 4$^{th}$ gear to 5$^{th}$ gear, which increases the acceleration 860 to match the new target 865.

In a fourth time period 858, the road grade 850 flattens out (e.g., the vehicle reaches the bottom of the downhill slope), resulting in a drop in the acceleration 860. This causes the downhill target acceleration control system 100 to make the power train torque request 880 less negative, resulting in an upshift of the transmission gear 870 from 5$^{th}$ gear to 6$^{th}$ gear, which is the top gear of the transmission, so that no further upshifts are possible. Thus, the vehicle acceleration drops below the target value 865, and continues decreasing until it drops below zero (e.g., the vehicle begins to slow down). At this point, in order to maintain vehicle speed, the driver may need to depress the accelerator pedal.

As can be seen in the graph 800, the speed 890 of the vehicle increases very little as a result of 30 seconds of travel down a grade of −6 (equivalent to a downhill slope of 5.4 degrees), varying from approximately 60 mph to a minimum of about 55 mph and a maximum of about 65 mph. Since this control is effected without input from the brake or accelerator pedals, and permits the driver to control the "road feel" and behavior of the vehicle more precisely, the downhill target acceleration control method 700 represents a clear improvement over the downhill acceleration control method 400 of FIG. 4.

Figure 9A:
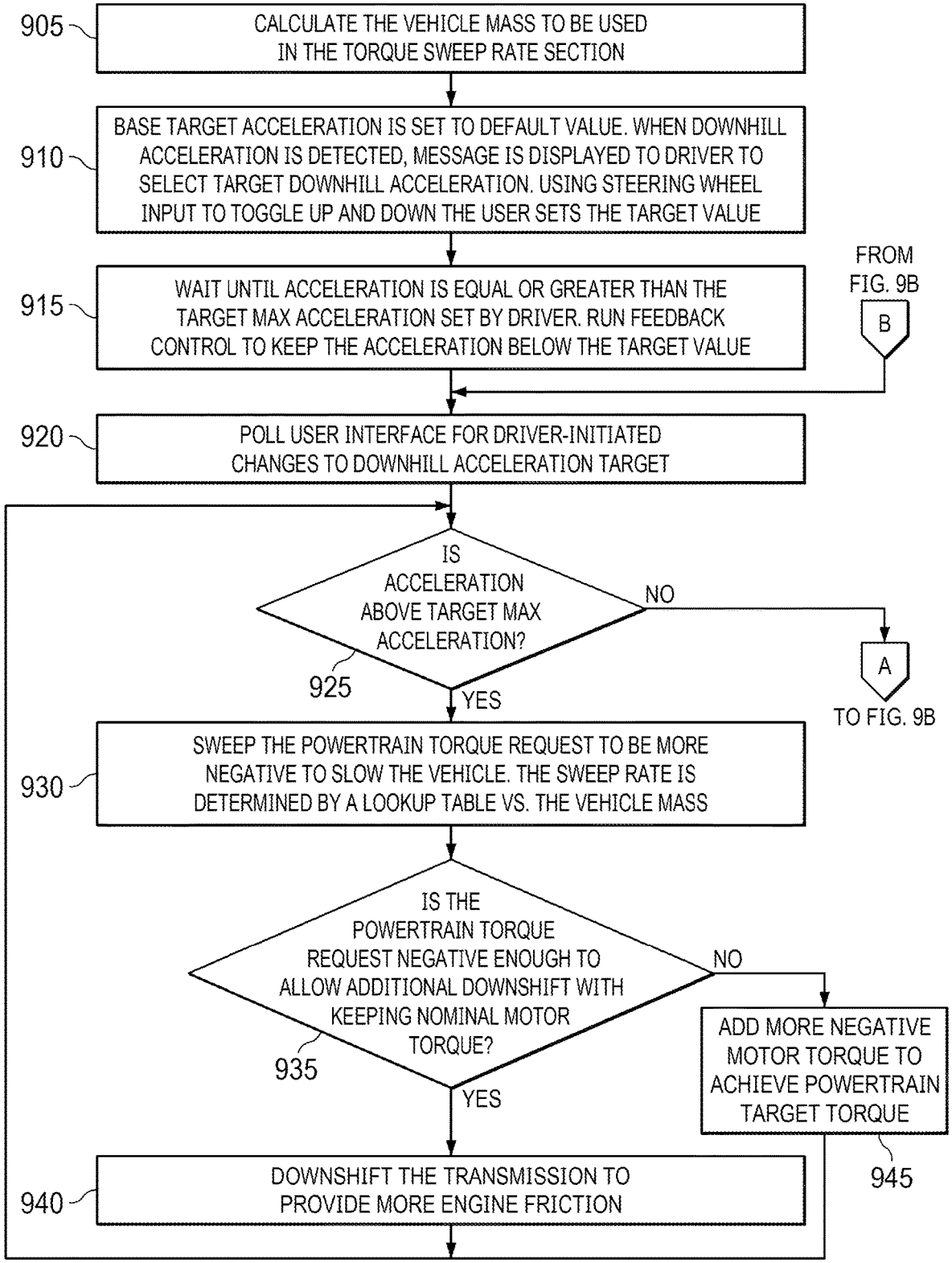
FIG. 9A shows a portion of a flow diagram of an example downhill target acceleration control method for a hybrid vehicle, in accordance with at least one embodiment of the present disclosure.
Figure 9B:
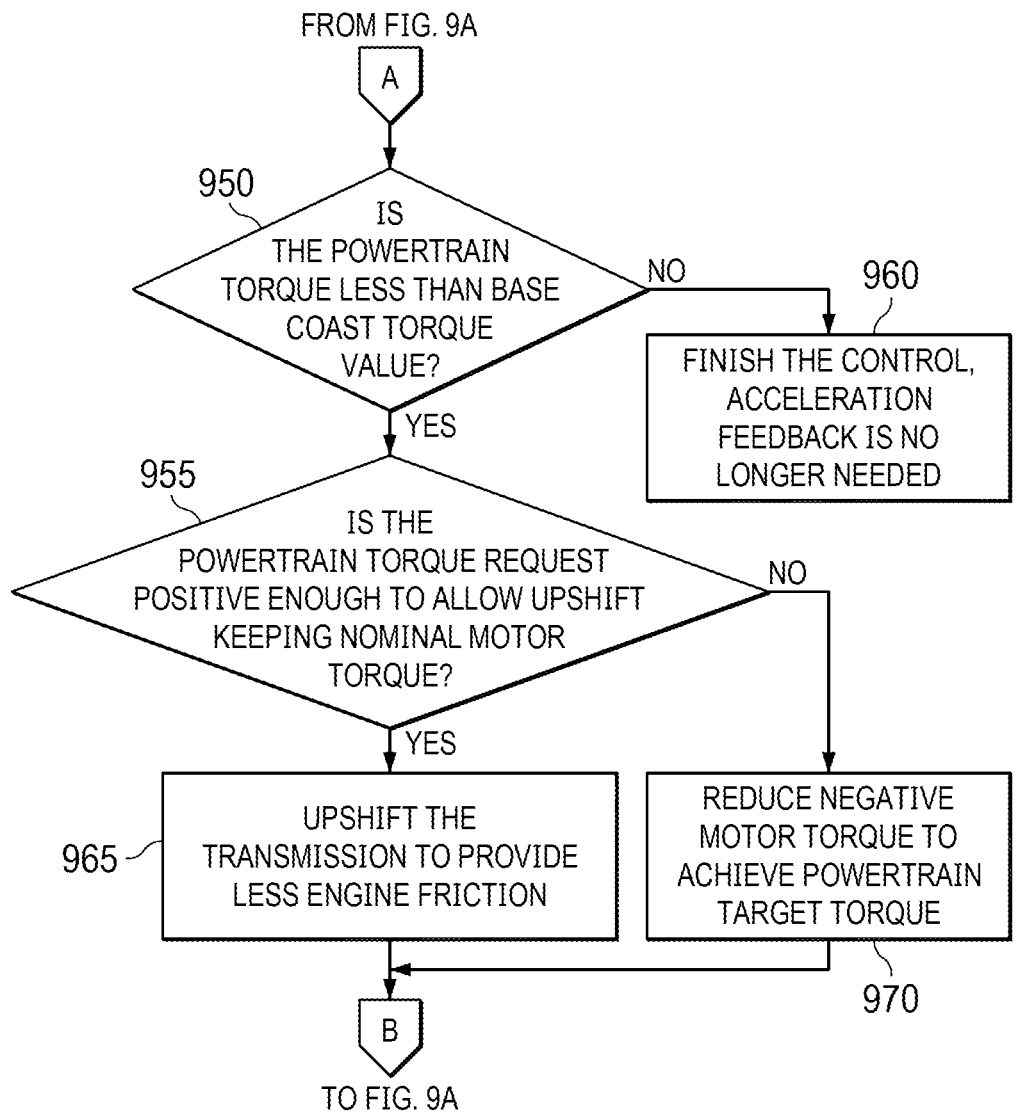
FIG. 9B shows a portion of a flow diagram of an example downhill target acceleration control method for a hybrid vehicle, in accordance with at least one embodiment of the present disclosure.

FIGS. 9A and 9B show a flow diagram of an example downhill target acceleration control method 900 for a hybrid vehicle, in accordance with at least one embodiment of the present disclosure.

In step 905, the method 900 includes calculating the vehicle mass as described above in FIG. 6. Execution then proceeds to step 910.

In step 910, the method 900 includes displaying a message to the driver indicating that downhill acceleration control is now in progress, showing the current downhill acceleration target value, and informing the user that the downhill acceleration target value can be altered (e.g., with a toggle located on the steering wheel) to be a higher or lower value. Execution then proceeds to step 915.

In step 915, the method 900 includes waiting (e.g., looping), executing the downhill acceleration feedback control loop, until a sensed acceleration is equal to or greater than the specified target acceleration or maximum acceleration. Execution then proceeds to step 920.

In step 920, the method 900 includes polling the user interface to determine if an input has been received to change the downhill target acceleration. If the input had been received, the method includes updating the default target downhill target acceleration based on the user input. The user input may for example be received via a steering wheel toggle input with an "up" position to increase the target acceleration and a "down" position to decrease the target acceleration. Execution then proceeds to step 925.

In step 925, the method 900 includes determining whether the current vehicle acceleration is greater than the downhill target acceleration. If yes, execution proceeds to then proceeds to step 930. If no, execution proceeds to step 950

In step 930, the method 900 includes calculating a new power train torque request to reduce the vehicle acceleration. This may for example be accomplished with a lookup table based on the vehicle mass and a gain value based on the difference between the current and target accelerations. Execution then proceeds to step 935.

In step 935, the method 900 includes determining whether the torque request is negative enough to allow for a downshift (or additional downshift) without being lower than the downhill acceleration target. If yes, execution proceeds to step 940. If no, execution proceeds to step 945.

In step 940, the method 900 includes downshifting the transmission to a lower gear to generate more engine braking. Execution then returns to step 920.

In step 945, the method 900 includes adding more negative motor torque (e.g., though regenerative braking with the electric motor system) to achieve the requested power train torque. Execution then returns to step 920.

In step 950, the method 900 includes determining whether the current power train torque is less than the value required for the vehicle to coast (e.g., the current torque will cause the vehicle to decelerate). If yes, execution proceeds to step 955. If no, execution proceeds to step 960.

In step 955, the method 900 includes determining whether the power train torque request is positive enough to allow for an upshift (or additional upshift) without exceeding the target acceleration. If yes, execution proceeds to step 965. If no, execution proceeds to step 970

In step 960, the method 900 includes finishing the control loop, as downhill acceleration feedback control is no longer necessary. The downhill target acceleration control method 900 is now complete.

In step 965, the method 900 includes upshifting the transmission to a higher gear to generate less engine braking. Execution then returns to step 920.

In step 970, the method 900 includes reducing the negative motor torque (e.g., by reducing regenerative braking of the electric motor system) to achieve the requested power train torque. Execution then returns to step 920.

It is noted that the downhill target acceleration control method 900 does not require any pedal input (e.g., accelerator pedal or brake pedal input) from the driver, and does not rely on a fixed value for the downhill acceleration target or downhill acceleration limit. Furthermore, in the absence of accelerator pedal input, the vehicle slows down less with the method 700 than it would in older control methods that do not include automatic upshifting.

FIG. 10A is a performance graph 1000 of the example downhill acceleration control method 900 for a hybrid vehicle, in accordance with at least one embodiment of the present disclosure. This graph is similar to graph 800 of FIG. 8, in that the vehicle proceeds down a hill and acceleration increases. When the acceleration of the vehicle is within a threshold distance (possibly zero) from the target acceleration without pedal input, the system displays a message or icon showing this control is starting to activate to control downhill speed. Once the control is activated, the system runs the feedback control described above to manage the powertrain negative torque and limit the vehicle's acceleration. The acceleration target without pedal input can be adjusted up or down by driver input, depending on preference. After the target acceleration is set, the powertrain must achieve that target, or display a message warning that warning not enough power train braking is available, and the system requires driver input (e.g., brakes or accelerator) in order to control the speed. If acceleration is within the capability of the power train, the system will downshift the engine to create more engine braking, and augment that engine braking with regenerative braking from the electric motor. If just pure EV augment the negative torque to hit the desired amount of acceleration.

The graph 1000 includes a Y-axis 1010 showing the transmission gear (nondimensional), road grade (nondimensional), and acceleration (m/s$^2$), and a Y-axis 1020 showing, vehicle speed (mph), power train torque (Newton-meters, e.g., negative torque due to friction, inertia, regenerative braking, etc. The graph 1000 also includes an X-axis 1040 showing elapsed time in seconds.

A "road grade" line 1050 shows a flat road gradually dropping into a steeper and steeper downhill grade, and then recovering to a nearly-zero grade at t=30 seconds. The downhill target acceleration control system 100 waits until the commanded acceleration can be met by a downshift then downshifts to meet the target. There is overshoot on the acceleration to preference a "stuck" feel over a "runaway" feel.

As can be seen in the graph 1000, the vehicle acceleration 1060 increases steadily through a time period 1051 until around t=7.5 seconds, when it exceeds the acceleration target 1065. At this point, the downhill target acceleration control system 100 changes the power train torque request 1080 to be more negative. This request is not large enough to require a gear change, and can be met entirely with regenerative braking from the electric motors.

At this point, a message appears to the driver, giving the driver the option to change the target acceleration 1065 without pedal input. The driver may, for example, use a touchscreen interface, or buttons, switches, or paddles on the steering wheel, to increase or decrease the target acceleration, without pedal input. This change can be made at any time while the vehicle continues to travel downhill.

Figure 10B:
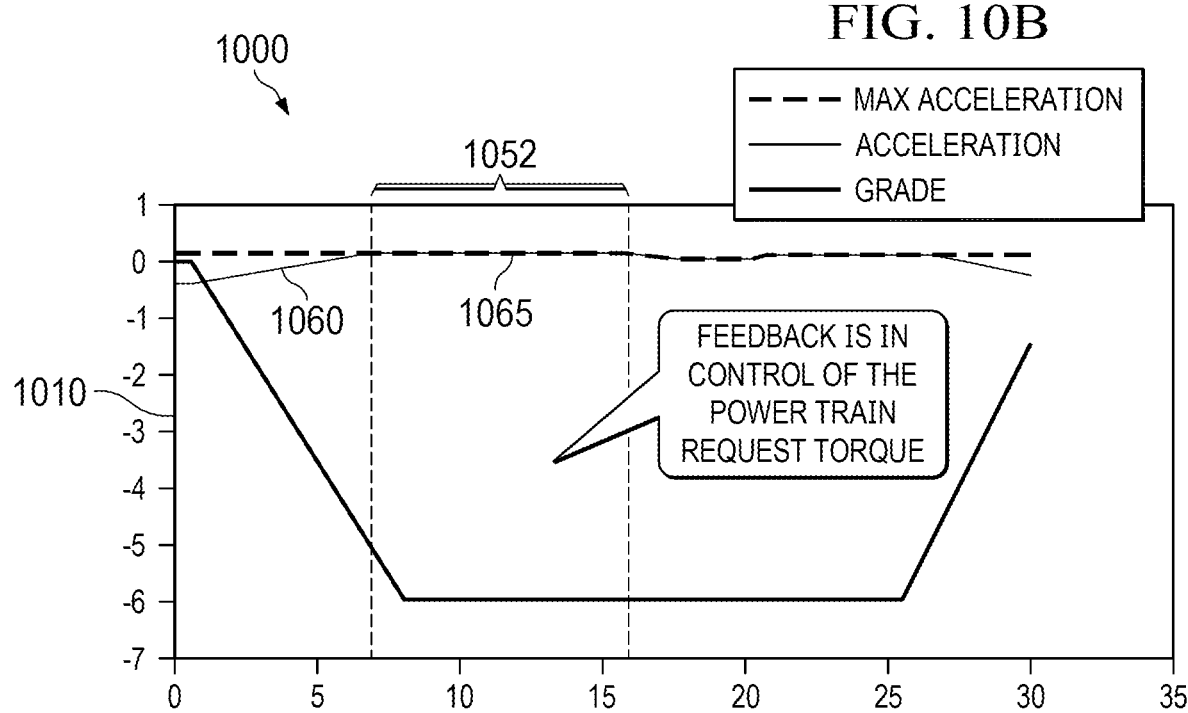
FIG. 10B is the same performance graph of the example downhill acceleration control method for a hybrid vehicle, with a different time period highlighted, in accordance with at least one embodiment of the present disclosure.
Figure 10B:
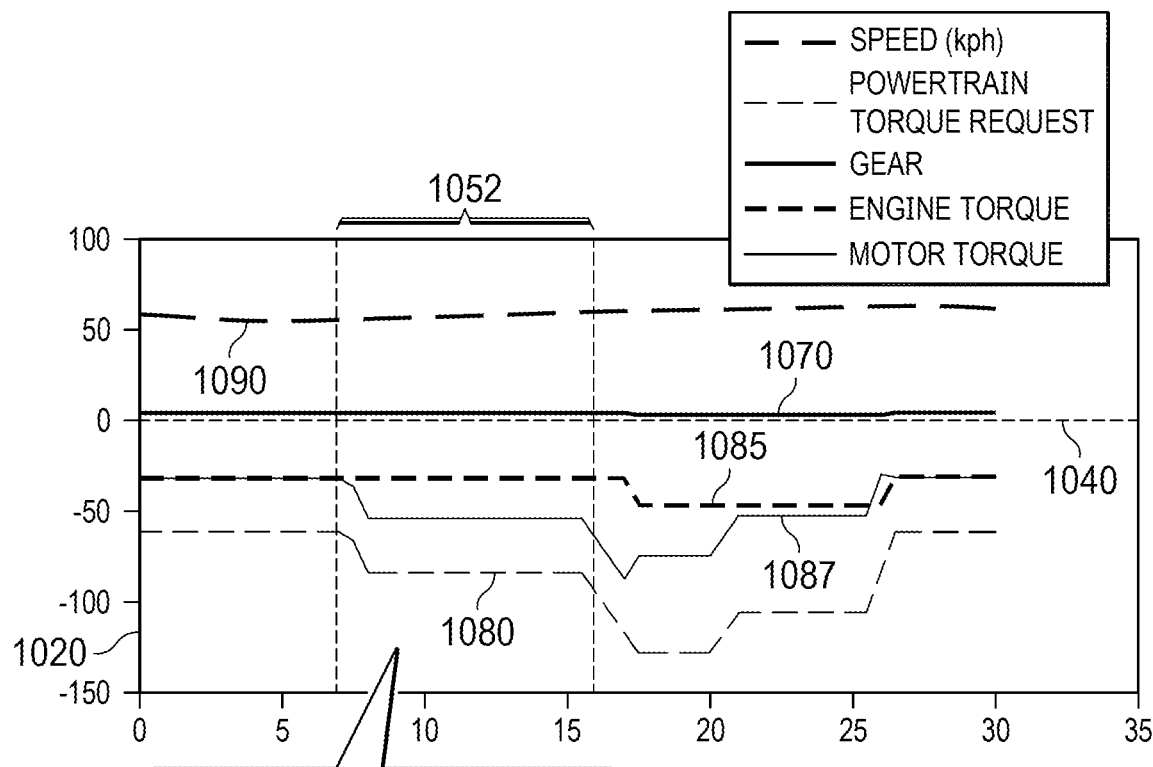

FIG. 10B is the same performance graph 1000 of the example downhill acceleration control method 900 for a hybrid vehicle, with a different time period highlighted, in accordance with at least one embodiment of the present disclosure. During a second time period 1052, the negative torque request for the power train is split between engine braking from the internal combustion engine and regenerative braking by the electric motors. The method 900 holds the vehicle acceleration at a constant value, approximately equal to the downhill acceleration target 1065.

Figure 10C:
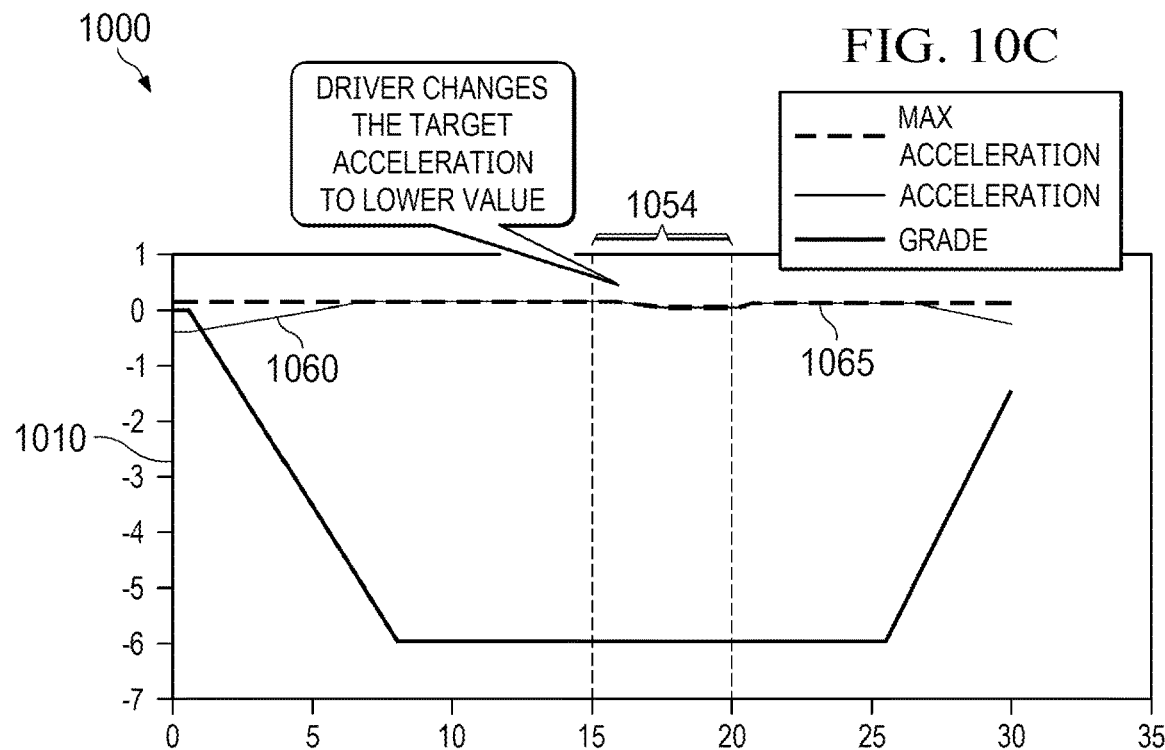
FIG. 10C is a is the same performance graph of the example downhill acceleration control method for a hybrid vehicle, with a different time period highlighted, in accordance with at least one embodiment of the present disclosure.
Figure 10C:
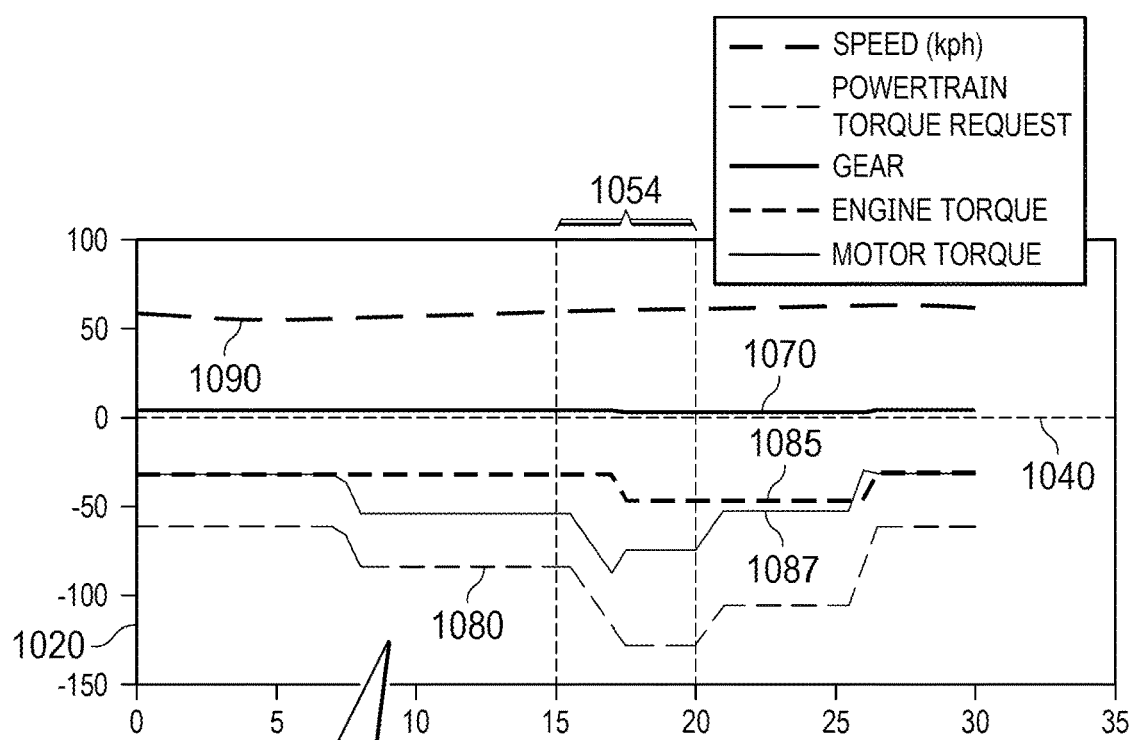

FIG. 10C is a is the same performance graph 1000 of the example downhill acceleration control method 900 for a hybrid vehicle, with a different time period highlighted, in accordance with at least one embodiment of the present disclosure. In a third time period 1054, the driver changes the acceleration target 1065 to be smaller than the current acceleration 1060. This causes the downhill target acceleration control system 100 to make the power train torque request 1080 even more negative. This demand is now large enough to result in a downshift of the transmission gear 1070, which reduces the acceleration 1060 to match the new target 1065.

FIG. 10D is a is the same performance graph 1000 of the example downhill acceleration control method 900 for a hybrid vehicle, with a different time period highlighted, in accordance with at least one embodiment of the present disclosure. In a fourth time period 1056, the driver changes the target acceleration again, to be larger than the current acceleration. This causes the downhill target acceleration control system 100 to make the power train torque request 1080 less negative. This demand can be met by decreasing regenerative braking of the electric motors, which increases the acceleration 1060 to match the new target 1065.

Figure 10E:
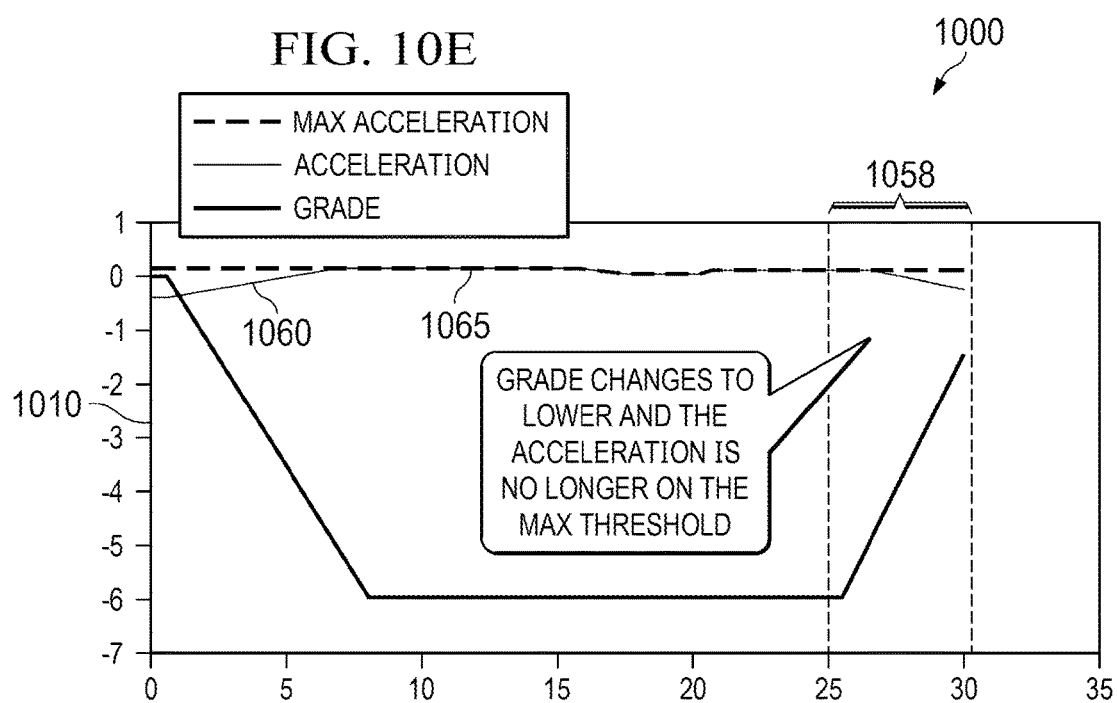
FIG. 10E is a is the same performance graph of the example downhill acceleration control method for a hybrid vehicle, with a different time period highlighted, in accordance with at least one embodiment of the present disclosure.
Figure 10E:
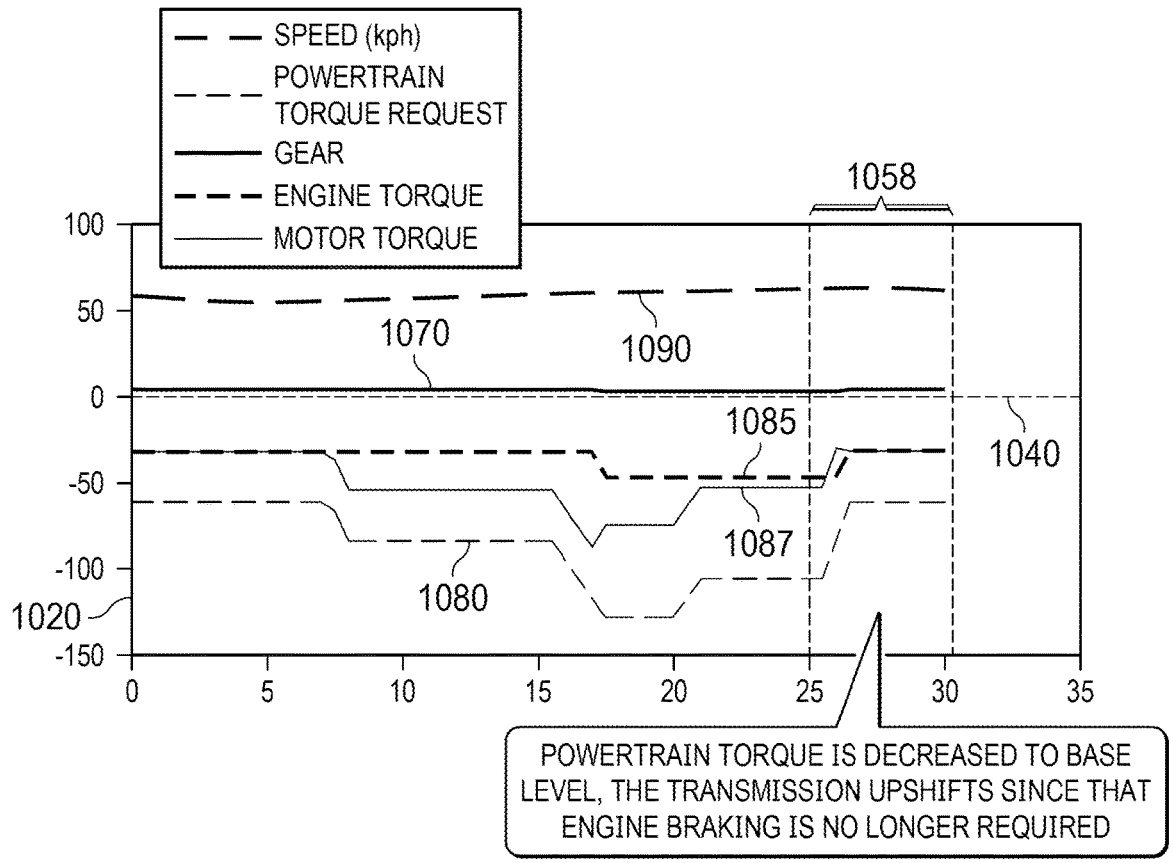

FIG. 10E is a is the same performance graph 1000 of the example downhill acceleration control method 900 for a hybrid vehicle, with a different time period highlighted, in accordance with at least one embodiment of the present disclosure. In a fifth time period 1058, the road grade 1050 flattens out (e.g., the vehicle reaches the bottom of the downhill slope), resulting in a drop in the acceleration 1060. This causes the downhill target acceleration control system 100 to make the power train torque request 1080 less negative, which now results in an upshift of the transmission gear 1070 from $5^{th}$ gear to $6^{th}$ gear, which is the top gear of the transmission, so that no further upshifts are possible. Thus, the vehicle acceleration drops below the target value 1065, and continues decreasing until it drops below zero (e.g., the vehicle begins to slow down). At this point, in order to maintain vehicle speed, the driver may need to depress the accelerator pedal.

As can be seen in the graph 1000, the speed 1090 of the vehicle increases very little as a result of 30 seconds of travel down a grade of −6 (equivalent to a downhill slope of 5.4 degrees), varying from approximately 60 mph to a minimum of about 55 mph and a maximum of about 65 mph. Since this control is effected without input from the brake or accelerator pedals, and permits the driver to control the "road feel" and behavior of the vehicle more precisely, the downhill target acceleration control method 900 represents a clear improvement over the downhill acceleration control method 400 of FIG. 4.

Figure 11:
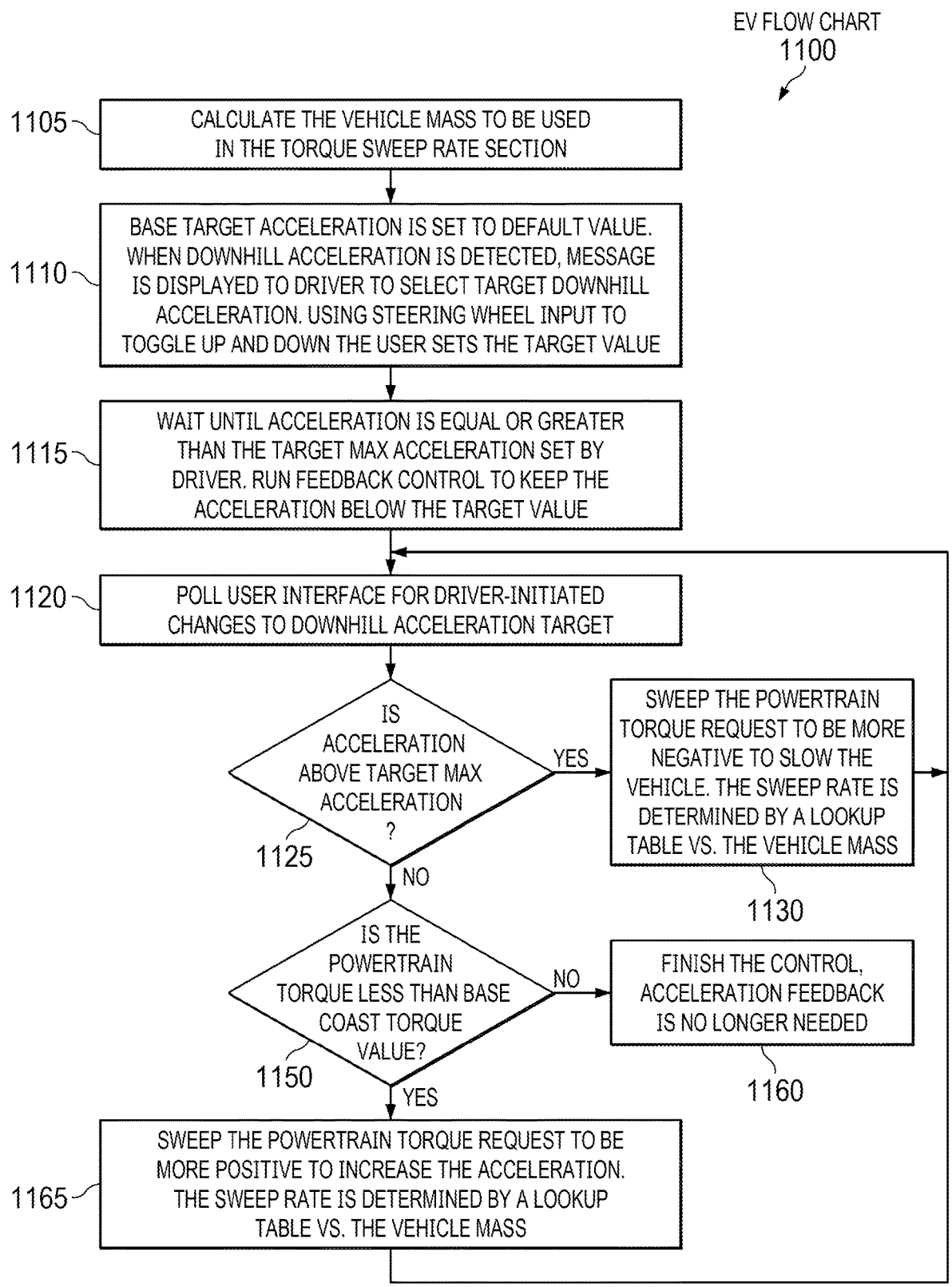
FIG. 11 shows a flow diagram of an example downhill target acceleration control method for a hybrid vehicle, in accordance with at least one embodiment of the present disclosure.

FIG. 11 shows a flow diagram of an example downhill target acceleration control method 1100 for a hybrid vehicle, in accordance with at least one embodiment of the present disclosure. This method is similar to the downhill target acceleration control method 900 for a hybrid vehicle except that for an EV vehicle the powertrain torque request is the motor request since that is the only driving element in the power train.

In step 1105, the method 1100 includes calculating the vehicle mass as described above in FIG. 6. Execution then proceeds to step 1110.

In step 1110, the method 1100 includes displaying a message to the driver indicating that downhill acceleration control is now in progress, showing the current downhill acceleration target value, and informing the user that the downhill acceleration target value can be altered (e.g., with a toggle located on the steering wheel) to be a higher or lower value. Execution then proceeds to step 1115.

In step 1115, the method 1100 includes waiting (e.g., looping), executing the downhill acceleration feedback control loop, until a sensed acceleration is equal to or greater than the target acceleration or specified maximum acceleration. Execution then proceeds to step 1120.

In step 1120, the method 1100 includes polling the user interface to determine if an input has been received to change the downhill target acceleration. If the input had been received, the method includes updating the default target downhill target acceleration based on the user input. The user input may for example be received via a steering wheel toggle input with an "up" position to increase the target acceleration and a "down" position to decrease the target acceleration. Execution then proceeds to step 1125.

In step 1125, the method 1100 includes determining whether the current vehicle acceleration is greater than the downhill target acceleration. If yes, execution proceeds to then proceeds to step 1130. If no, execution proceeds to step 1150.

In step 1130, the method 1100 includes calculating a new power train torque request to reduce the vehicle acceleration. This may for example be accomplished with a lookup table based on the vehicle mass and a gain value based on the difference between the current and target accelerations. Execution then returns to step 1120.

In step 1150, the method 1100 includes determining whether the current power train torque is less than the value required for the vehicle to coast (e.g., the current torque will cause the vehicle to decelerate). If yes, execution proceeds to step 1165. If no, execution proceeds to step 1160.

In step 1160, the method 1100 includes finishing the control loop, as downhill acceleration feedback control is no longer necessary. The downhill target acceleration control method 1100 is now complete.

In step 1165, the method 1100 includes calculating a new power train torque request to increase the vehicle acceleration. This may for example be accomplished with a lookup table based on the vehicle mass and a gain value based on the difference between the current and target accelerations. Execution then returns to step 1120.

It is noted that the downhill target acceleration control method 1100 does not require any pedal input (e.g., accelerator pedal or brake pedal input) from the driver, and does not rely on a fixed value for the downhill acceleration target or downhill acceleration limit.

Figure 12:
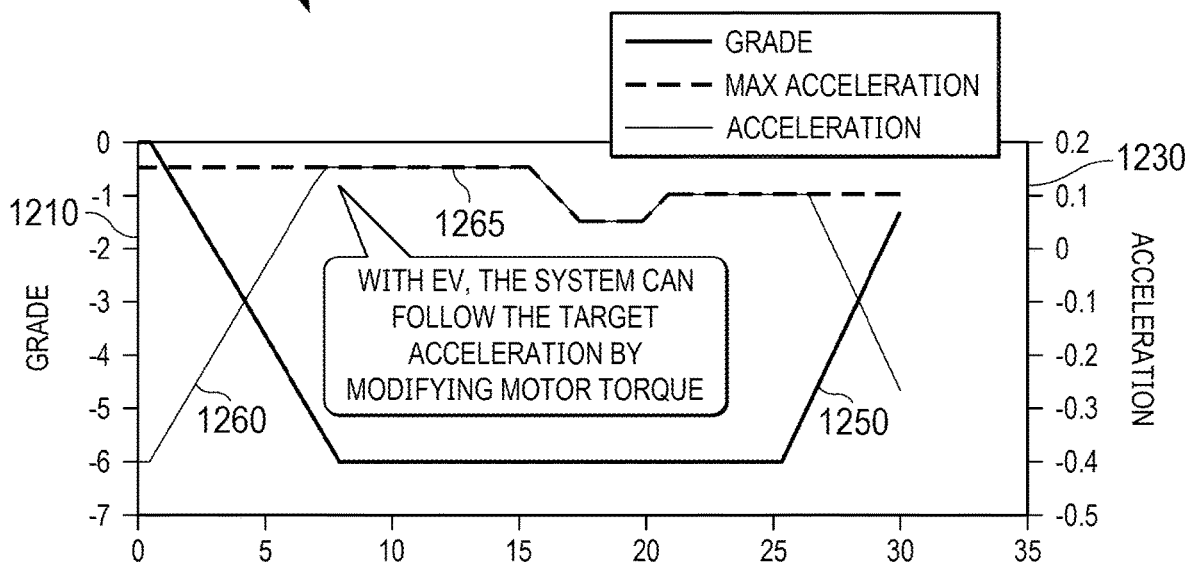
FIG. 12 is a performance graph of the example downhill acceleration control method for fully electric vehicle (EV), in accordance with at least one embodiment of the present disclosure.
Figure 12:
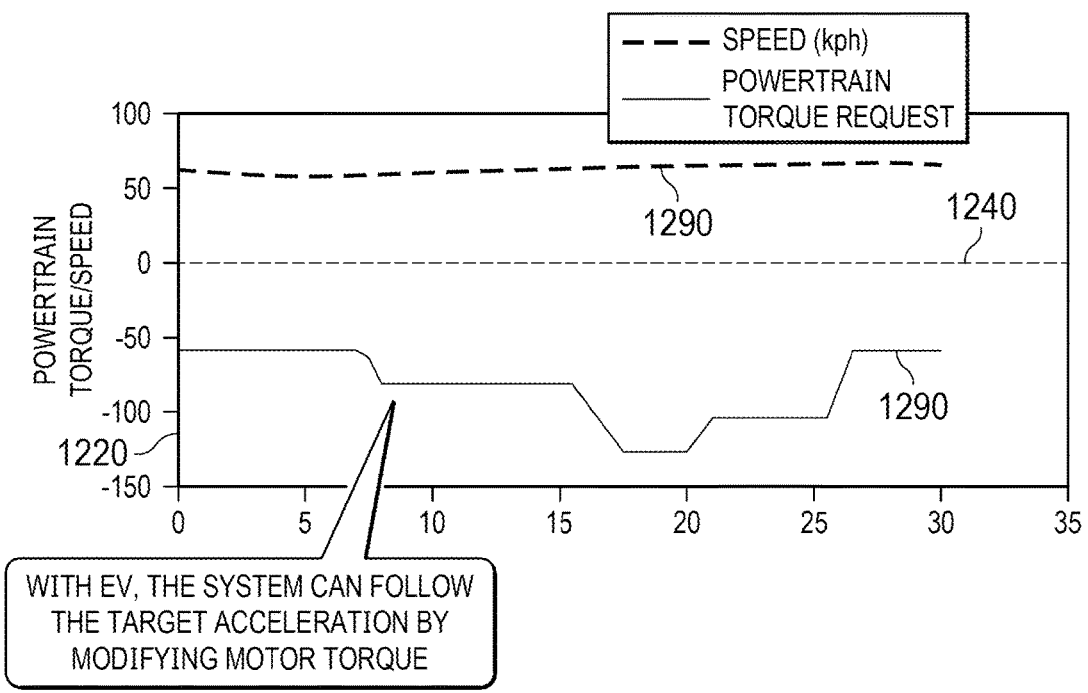

FIG. 12 is a performance graph 1200 of the example downhill acceleration control method 1100 for fully electric vehicle (EV), in accordance with at least one embodiment of the present disclosure. This graph is similar to graph 1000 of FIGS. 10A-10E, with the same timeline, the same hill, and the same driver responses. When the acceleration of the vehicle is within a threshold distance (possibly zero) from the target acceleration without pedal input, the system displays a message or icon showing that downhill acceleration control is starting to activate, to control downhill speed and prevent a "runaway" feeling. Once the control is activated, the system runs the feedback control described above to manage the powertrain negative torque and limit the vehicle's acceleration. The acceleration target without pedal input can be adjusted up or down by driver input, depending on preference. After the target acceleration is set, the powertrain must achieve that target, or display a message warning that warning not enough power train braking is available, and the system requires driver input (e.g., brakes or accelerator) in order to control the speed. If acceleration is within the capability of the power train, the system will use regenerative braking from the electric motor to generate negative torque and thus limit acceleration.

The graph 1200 includes a Y-axis 1210 showing the road grade (nondimensional), a Y-axis 1230 showing acceleration (m/s$^2$), and a Y-axis 1220 showing power train torque (N-m) and vehicle speed (mph). The graph 1200 also includes an X-axis 1240 showing elapsed time in seconds.

A "road grade" line 1250 shows a flat road gradually dropping into a steeper and steeper downhill grade, and then recovering to a nearly-zero grade at t=30 seconds. As can be seen in the graph 1200, the vehicle acceleration 1260 increases steadily until around t=7.5 seconds, when it exceeds the acceleration target 1265. At this point, the downhill target acceleration control system 100 changes the power train torque request 880 to be more negative. Since there is no internal combustion engine for engine braking and no transmission for downshifting, this demand must be met entirely with regenerative braking from the electric motors.

At this point, a message appears to the driver, giving the driver the option to change the target acceleration 1065 without accelerator or brake pedal input. The driver may, for example, use a touchscreen interface, or buttons, switches, or paddles on the steering wheel, to increase or decrease the target acceleration, without pedal input. This change can be made at any time while the vehicle continues to travel downhill.

The events in the graph 1200 are the same as those in graph 1000, except that the EV does not have a geared transmission or an internal combustion engine. Thus, no gear changes or engine braking are possible, and the entire negative power train torque request is met through regenerative braking by the electric motors. Thus, the powertrain torque request 1290 is the power train torque, and the acceleration 1260 closely follows the target acceleration 1265, without the delays associated with gear shifting.

As can be seen in the graph 1200, the speed 1290 of the vehicle increases very little as a result of 30 seconds of travel down a grade of −6 (equivalent to a downhill slope of 5.4 degrees), varying from approximately 60 mph to a minimum of about 55 mph and a maximum of about 65 mph Since this control is effected without input from the brake or accelerator pedals, and permits the driver to control the "road feel" and behavior of the vehicle more precisely, the downhill target acceleration control method 1100 represents a clear improvement over the downhill acceleration control method 400 of FIG. 4.

Figure 13:
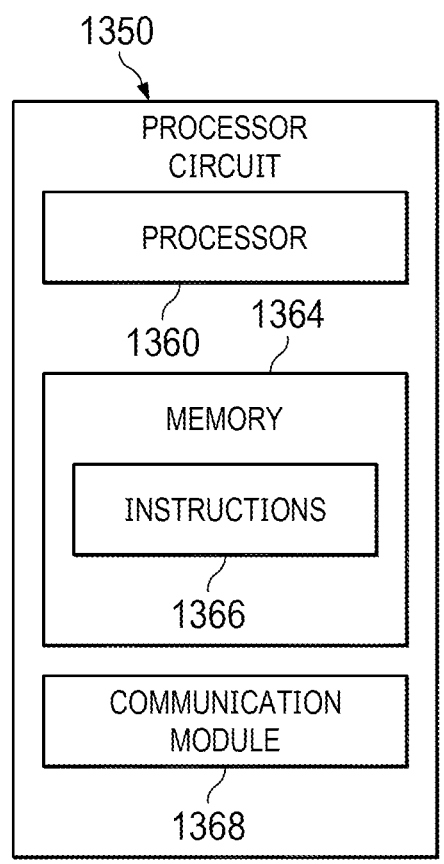
FIG. 13 is a schematic diagram of a processor circuit, according to embodiments of the present disclosure.

FIG. 13 is a schematic diagram of a processor circuit 1350, according to embodiments of the present disclosure. The processor circuit 1350 may be implemented in the system 100, or other devices or workstations (e.g., third-party workstations, network routers, etc.), or on a cloud processor or other remote processing unit, as necessary to implement the method. As shown, the processor circuit 1350 may include a processor 1360, a memory 1364, and a communication module 1368. These elements may be in direct or indirect communication with each other, for example via one or more buses.

The processor 1360 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1360 may also comprise another hardware device, a firmware device, or any combination thereof configured to perform the operations described herein. The processor 1360 may also be implemented as a combination of computing devices, e.g., a combination of a DSP and a microprocessor, a plurality of microprocessors, one or more microprocessors in conjunction with a DSP core, or any other such configuration.

The memory 1364 may include a cache memory (e.g., a cache memory of the processor 1360), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1364 includes a non-transitory computer-readable medium. The memory 1364 may store instructions 1366. The instructions 1366 may include instructions that, when executed by the processor 1360, cause the processor 1360 to perform the operations described herein. Instructions 1366 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1368 can include any electronic circuitry and/or logic circuitry to facilitate direct or indirect communication of data between the processor circuit 1350, and other processors or devices. In that regard, the communication module 1368 can be an input/output (I/O) device. In some instances, the communication module 1368 facilitates direct or indirect communication between various elements of the processor circuit 1350 and/or the system 100. The communication module 1368 may communicate within the processor circuit 1350 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the downhill target acceleration control system advantageously controls downhill acceleration to a desired value, and permits the driver to adjust the desired value in real time, without input from the brake or accelerator pedals. Accordingly, it can be seen that the downhill target acceleration control system fills a need in the art, by allowing drivers to customize the behavior and road feel of the vehicle in real time.

A number of variations are possible on the examples and embodiments described above. For example, the technology described herein may be implemented on manually controlled vehicles, driver-assist vehicles, or fully autonomous vehicles. The technology may be implemented in diverse combinations of hardware, software, and firmware, depending on the implementation or as necessitated by the structures and modules already present in existing vehicles. The system may be employed on vehicles with automatic transmission, or vehicles with simulated shifting, including continuously variable transmission (CVT), infinitely variable transmission (IVT), and hybrid transmissions (e.g., a hybrid vehicle with 4-speed automatic transmission simulating 10 gears).

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the downhill target acceleration control system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide a complete description of the structure and use of exemplary embodiments of the downhill target acceleration control system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. For example, additional sensors such as weight sensors, inclinometers, magnetometers, GPS, and accelerometers may be employed to compute road grade and vehicle weight. Additionally, sensors external to the vehicle may be employed to provide or supplement any of the sensor data described hereinabove. Alternatively, machine learning algorithms or other AI systems may be used to estimate variables from sparse, noisy, or entwined data streams without departing from the spirit of the present disclosure.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A downhill target acceleration control system for a vehicle, the system comprising:
   the vehicle;
   a first sensor configured to determine a road grade of a road at a current position of the vehicle;
   a second sensor configured to determine an acceleration of the vehicle in a direction tangent to a surface of the road;
   a processor comprising a memory and configured to:
      store a downhill acceleration target value;
      determine a mass of the vehicle;
      based on the road grade and the acceleration, detect whether a downhill acceleration of the vehicle exceeds the downhill acceleration target value by more than a first threshold amount;
      if the downhill acceleration of the vehicle exceeds the downhill acceleration target value by more than the first threshold amount:
         receive and implement a driver-initiated change to the downhill acceleration target value, wherein the driver-initiated change does not require an input from an accelerator pedal of the vehicle or a brake pedal of the vehicle;
         based on the downhill acceleration, the downhill acceleration target value, and the mass of the vehicle, generate a negative power train torque request to reduce the downhill acceleration of the vehicle; and
         if, after generating the negative power train torque request, the acceleration of the vehicle is below the downhill acceleration target value by more than a second threshold amount, reduce the negative power train torque request to increase the downhill acceleration of the vehicle.

2. The system of claim 1, wherein receiving the driver-initiated change involves displaying a message to the driver and receiving inputs from the driver in response to the message.

3. The system of claim 1, wherein the processor is further configured to, after generating the negative power train torque request, downshift a transmission of the vehicle in order to meet the negative power train torque request.

4. The system of claim 1, wherein the processor is further configured to, after generating the negative power train torque request, increase regenerative braking of an electric motor of the vehicle in order to meet the negative power train torque request.

5. The system of claim 1, wherein the processor is further configured to, after reducing the negative power train torque request, upshift a transmission of the vehicle in order to meet the reduced negative power train torque request.

6. The system of claim 1, wherein the processor is further configured to, after reducing the negative power train torque request, decrease regenerative braking of an electric motor of the vehicle in order to meet the reduced negative power train torque request.

7. The system of claim 1, wherein the processor is further configured to, if the negative torque available is insufficient to meet the generated negative torque request, issue a warning to the driver to activate the brake pedal.

8. The system of claim 1, wherein the processor is further configured to, if the increased downhill acceleration of the vehicle is less than the downhill acceleration target value, issue a warning to the driver to activate the accelerator pedal.

9. The system of claim 1, wherein generating the negative power train torque request is further based on a gain value, wherein the gain value is proportional to a difference between the downhill acceleration and the downhill acceleration target value.

10. The system of claim 1, wherein at least one of the first threshold amount or the second threshold amount is greater than zero.

11. A downhill target acceleration control method for a vehicle, the method comprising:
    with a processor comprising a memory:
       storing a downhill acceleration target value;
       with a first sensor, determining a road grade of a road at a current position of the vehicle;
       with a second sensor, determining an acceleration of the vehicle in a direction tangent to a surface of the road;
       determining a mass of the vehicle;
       based on the road grade and the acceleration, detecting whether a downhill acceleration of the vehicle exceeds the downhill acceleration target value by more than a first threshold amount;
       if the downhill acceleration of the vehicle exceeds the downhill acceleration target value by more than the first threshold amount:
          receiving and implementing a driver-initiated change to the downhill acceleration target value, wherein the driver-initiated change does not require an input from an accelerator pedal of the vehicle or a brake pedal of the vehicle;
          based on the downhill acceleration, the downhill acceleration target value, and the mass of the vehicle, generating a negative power train torque request to reduce the downhill acceleration of the vehicle; and
          if, after generating the negative power train torque request, the acceleration of the vehicle is below the downhill acceleration target value by more than a second threshold amount, reducing the negative power train torque request to increase the downhill acceleration of the vehicle.

12. The method of claim 11, wherein receiving the driver-initiated change involves displaying a message to the driver and receiving inputs from the driver in response to the message.

13. The method of claim 11, further comprising: after generating the negative power train torque request, downshifting a transmission of the vehicle in order to meet the negative power train torque request.

14. The method of claim 11, further comprising: after generating the negative power train torque request, increasing regenerative braking of an electric motor of the vehicle in order to meet the negative power train torque request.

15. The method of claim 11, further comprising: after reducing the negative power train torque request, upshifting a transmission of the vehicle in order to meet the reduced negative power train torque request.

16. The method of claim 11, further comprising: after reducing the negative power train torque request, decreasing regenerative braking of an electric motor of the vehicle in order to meet the reduced negative power train torque request.

17. The method of claim 11, further comprising: if the negative torque available is insufficient to meet the generated negative torque request, issuing a warning to the driver to activate the brake pedal.

18. The method of claim 11, further comprising: if the increased downhill acceleration of the vehicle is less than the downhill acceleration target value, issuing a warning to the driver to activate the accelerator pedal.

19. The method of claim 11, wherein generating the negative power train torque request is further based on a gain value, wherein the gain value is proportional to a difference between the downhill acceleration and the downhill acceleration target value.

20. A downhill target acceleration control method for a vehicle, the method comprising:

with a processor comprising a memory:
    storing a downhill acceleration target value;
    detecting whether a downhill acceleration of the vehicle exceeds the downhill acceleration target value by more than a first threshold amount;
    if the downhill acceleration of the vehicle exceeds the downhill acceleration target value by more than the first threshold amount:
        receiving and implementing a driver-initiated change to the downhill acceleration target value, wherein the driver-initiated change does not require an input from an accelerator pedal of the vehicle or a brake pedal of the vehicle;
        based on the downhill acceleration and the downhill acceleration target value, generating a negative power train torque request to reduce the downhill acceleration of the vehicle; and
        if, after generating the negative power train torque request, the acceleration of the vehicle is below the downhill acceleration target value by more than a second threshold amount, reducing the negative power train torque request to increase the downhill acceleration of the vehicle.

\* \* \* \* \*